US012803737B2

(12) United States Patent
Chi et al.

(10) Patent No.: US 12,803,737 B2
(45) Date of Patent: Nov. 17, 2026

(54) SIGNAL SENDING METHOD, USER EQUIPMENT, AND RIS ARRAY

(71) Applicant: Beijing Xiaomi Mobile Software Co., Ltd., Beijing (CN)

(72) Inventors: Liangang Chi, Beijing (CN); Haoxiang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 274 days.

(21) Appl. No.: 18/707,881

(22) PCT Filed: Nov. 8, 2021

(86) PCT No.: PCT/CN2021/129391
§ 371 (c)(1),
(2) Date: May 6, 2024

(87) PCT Pub. No.: WO2023/077525
PCT Pub. Date: May 11, 2023

(65) Prior Publication Data

US 2026/0074852 A1 Mar. 12, 2026

(51) Int. Cl.
*H04L 5/00* (2006.01)
*H04B 7/04* (2017.01)

(52) U.S. Cl.
CPC ....... *H04L 5/0048* (2013.01); *H04B 7/04013* (2023.05); *H04L 5/0007* (2013.01)

(58) Field of Classification Search
CPC ................ H04B 7/04013; H04B 7/026; H04B 7/15528; H01Q 15/148; H04L 5/0048; H04L 5/0007; H04L 27/2636; H04L 27/2646; H04L 27/2666; H04L 27/2698
See application file for complete search history.

(56) References Cited

U.S. PATENT DOCUMENTS 12,425,994 B2 * 9/2025 Zhang .............. H04W 56/0015
2016/0112167 A1 4/2016 Xu et al.
2018/0359646 A1 * 12/2018 Tomeba ............... H04W 16/28
2020/0389268 A1 * 12/2020 Sathyanarayan ........................... H04L 27/26532
2021/0013619 A1 1/2021 Alkhateeb et al.
(Continued)

FOREIGN PATENT DOCUMENTS

CN 101729091 A 6/2010
CN 111817768 A 10/2020

OTHER PUBLICATIONS

International Search Report issued in Application PCT/CN2021/129391, dated Jun. 16, 2022, with English translation, (4p).
(Continued)

*Primary Examiner* — Brian J. Gillis
(74) *Attorney, Agent, or Firm* — Arch & Lake LLP; Hao Tan; Shen Wang

(57) ABSTRACT

A method for sending a signal, performed by a reconfigurable intelligent surface (RIS) array, includes: determining a mapping relationship between an active RIS array element in the RIS array and a time-frequency resource; sending the mapping relationship to a user equipment (UE); and sending a pilot signal to the UE by mapping the pilot signal sent by the active RIS array element to the time-frequency resource corresponding to the active RIS array element.

19 Claims, 18 Drawing Sheets

(56) References Cited

U.S. PATENT DOCUMENTS

| | | | | |
|---|---|---|---|---|
| 2023/0352847 | A1* | 11/2023 | Alkhateeb | H04B 7/04013 |
| 2024/0007881 | A1* | 1/2024 | Gutman | H04B 7/15 |
| 2024/0250747 | A1* | 7/2024 | Li | H04B 7/026 |
| 2024/0365152 | A1* | 10/2024 | Elshafie | H04L 25/0254 |
| 2026/0012228 | A1* | 1/2026 | Wang | H04B 7/04013 |
| 2026/0019968 | A1* | 1/2026 | Zhang | H04W 56/0015 |

OTHER PUBLICATIONS

The extended European search report issued in Application No. 21963034.0 dated Dec. 9, 2024, (17p).

* cited by examiner

SIGNAL SENDING METHOD, USER EQUIPMENT, AND RIS ARRAY

CROSS-REFERENCE TO RELATED APPLICATIONS

The present application is a U.S. national phase of International Application No. PCT/CN2021/129391, filed on Nov. 8, 2021, the entire disclosure of which is incorporated herein by reference for all purposes.

FIELD

The present disclosure relates to the field of communication technology, and more particularly to a method and apparatus for sending a signal, a user equipment, an RIS array and a storage medium.

BACKGROUND

Reconfigurable intelligent surface (RIS) technology is introduced into a wireless communication system to improve coverage and capacity of a wireless communication network. When communication is performed based on the RIS technology, in order to ensure an accuracy of a signal transmission, a channel estimation needs to be performed on a channel between an RIS array and a UE (i.e., a terminal device). Specifically, an active array element in the RIS array will send a pilot signal to the UE, and the UE estimates the channel between the RIS array and the UE based on the received pilot signal.

It should be noted that when the RIS array sends the pilot signal to the UE, a position of the pilot signal in a time domain resource will affect precision and accuracy of the channel estimation. Therefore, there is an urgent need for a method for setting a mapping relationship between a pilot signal sent by an RIS array and a time domain resource to ensure the precision and accuracy of the channel estimation based on the pilot signal.

SUMMARY

Embodiments of a first aspect of the present disclosure provide a method for sending a signal, which is performed by an RIS array and includes: determining a mapping relationship between an active RIS array element in the RIS array and a time-frequency resource; sending the mapping relationship to a user equipment (UE); and sending a pilot signal to the UE by mapping the pilot signal sent by the active RIS array element to a time-frequency resource corresponding to the active RIS array element.

Embodiments of a second aspect of the present disclosure provide a method for sending a signal, which is performed by a UE and includes: obtaining a mapping relationship sent by an RIS array; and obtaining a pilot signal, sent by an active RIS array element in the RIS array, from a time-frequency resource according to the mapping relationship.

Embodiments of a third aspect of the present disclosure provide a communication device, which includes a processor, and a memory having stored therein a computer program that, when executed by the processor, causes the communication device to implement the method provided in embodiments of the first aspect above.

Embodiments of a fourth aspect of the present disclosure provide a communication device, which includes a processor, and a memory having stored therein a computer program that, when executed by the processor, causes the communication device to implement the method provided in embodiments of the second aspect above.

Embodiments of a fifth aspect of the present disclosure provide a communication device, which includes a processor and an interface circuit. The interface circuit is configured to receive a code instruction and transmit the code instruction to the processor. The processor is configured to run the code instruction to implement the method provided in embodiments of the first aspect.

Embodiments of a sixth aspect of the present disclosure provide a communication device, which includes a processor and an interface circuit. The interface circuit is configured to receive a code instruction and transmit the code instruction to the processor. The processor is configured to run the code instruction to implement the method provided in embodiments of the second aspect.

Embodiments of a seventh aspect of the present disclosure provide a non-transitory computer-readable storage medium, which has stored therein instructions that, when executed, cause the method provided in embodiments of the first aspect to be implemented.

Embodiments of an eighth aspect of the present disclosure provide a non-transitory computer-readable storage medium, which has stored therein instructions that, when executed, cause the method provided in embodiments of the second aspect to be implemented.

BRIEF DESCRIPTION OF THE DRAWINGS

The above and/or additional aspects and advantages of the present disclosure will become apparent and more readily appreciated from the following descriptions made with reference to the drawings, in which.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of devices and methods consistent with some aspects of embodiments of the present disclosure as recited in the appended claims.

Terms used herein in embodiments of the present disclosure are only for the purpose of describing specific embodiments, but should not be construed to limit embodiments of the present disclosure. As used in embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second," and "third" may be used in embodiments of the present disclosure for describing various information, the information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

The method, apparatus, user equipment, RIS array and storage medium provided by embodiments of the present disclosure are described in detail below with reference to the accompanying drawings.

Figure 1A:
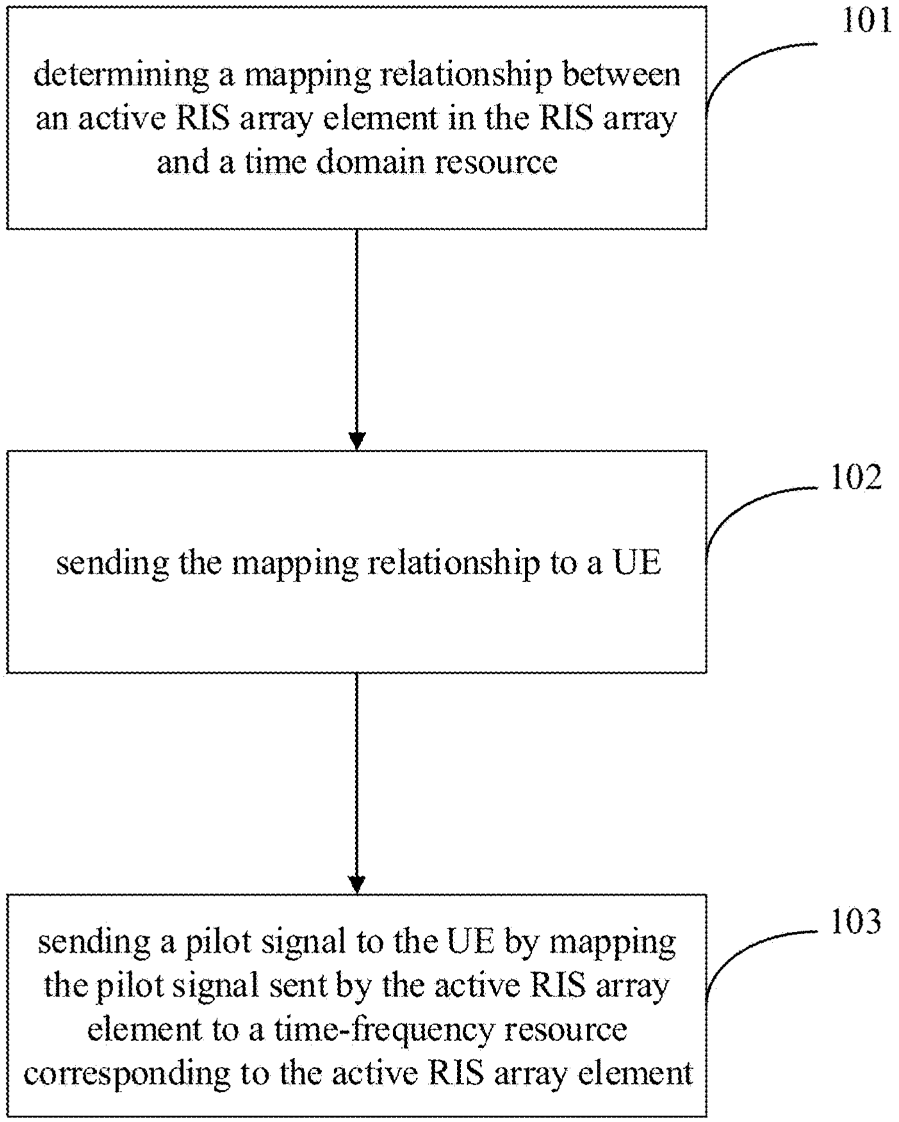
FIG. 1A is a flowchart of a method for sending a signal provided by an embodiment of the present disclosure.

FIG. 1A is a flowchart of a method for sending a signal provided by an embodiment of the present disclosure, which is applied to an RIS array. As shown in FIG. 1A, the method for sending the signal may include the following steps.

In step 101, a mapping relationship between an active RIS array element in the RIS array and a time domain resource is determined.

Figure 1B:
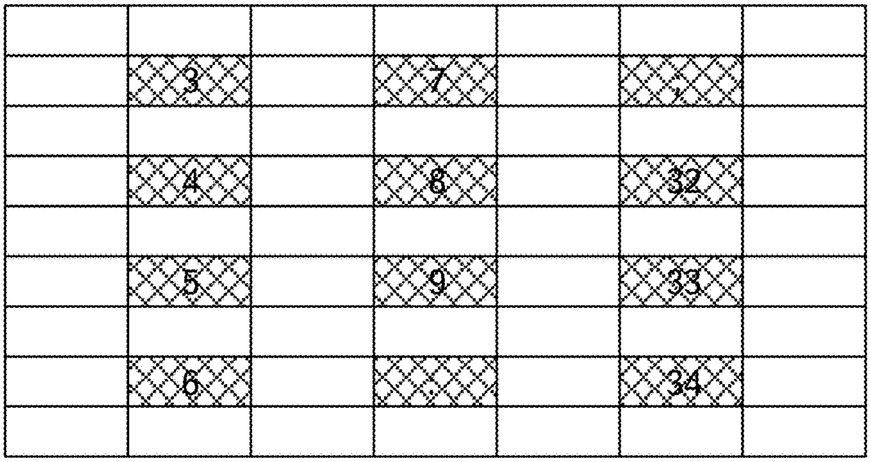
FIG. 1B is a schematic diagram of active RIS array elements in an RIS array provided by an embodiment of the present disclosure.

In an embodiment of the present disclosure, the RIS array itself is almost passive, but the RIS array includes the active RIS array element, which may be configured to send a signal (such as a pilot signal) to a UE, so that the UE may perform a channel estimation on a channel between the RIS array and the UE based on the received pilot signal. For example, FIG. 1B is a schematic diagram of active RIS array elements in an RIS array provided by an embodiment of the present disclosure. As shown in FIG. 1B, the RIS array is one 7×9 array. The RIS array includes 12 active RIS array elements, i.e., active RIS array element 1, active RIS array element 2, active RIS array element 3, . . . , and active RIS array element 12, the above individual active RIS array elements may be used to send pilot signals to the UE.

Furthermore, in an embodiment of the present disclosure, the above time domain resource may include at least one orthogonal frequency division multiplexing (OFDM) symbol, and each OFDM symbol may include at least one subcarrier (or resource element (RE)). Specifically, a pilot signal is sent to the UE by mapping the pilot signal sent by the active RIS array element to the subcarrier (or the RE).

Furthermore, in an embodiment of the present disclosure, there may be various different mapping relationships between the active RIS array element in the RIS array and the time domain resource. Determining the various different mapping relationships between the active RIS array element in the RIS array and the time domain resource will be described in detail in subsequent embodiments.

In step 102, the mapping relationship is sent to a UE.

In an embodiment of the present disclosure, a communication device may be a UE. The UE may refer to a device that provides voice and/or data connectivity to a user. The UE may communicate with one or more core networks via a radio access network (RAN). The UE may be an Internet of Things terminal, such as a sensor device, a mobile phone (or referred to as a "cellular" phone), and a computer with the Internet of Things terminal. For example, it may be a fixed, portable, pocket-sized, handheld, built-in computer, or vehicle-mounted apparatus. For example, it may be a station (STA), a subscriber unit, a subscriber station, a mobile station, a mobile, a remote station, an access point, a remote terminal, an access terminal, a user terminal or a user agent. Alternatively, the UE may also be a device of an unmanned aerial vehicle. Alternatively, the UE may also be a vehicle-mounted device, for example, a driving computer with a wireless communication function, or a wireless terminal externally connected with a driving computer. Alternatively, the UE may also be a roadside device, such as a street lamp, a signal lamp, or other roadside devices with a wireless communication function.

In an embodiment of the present disclosure, after the RIS array determines the mapping relationship between the active RIS array element and the time domain resource, the determined mapping relationship may be sent to the UE, so that the UE may subsequently receive the pilot signal, sent by the active RIS array element, on a corresponding time domain resource according to the mapping relationship.

In step 103, a pilot signal is sent to the UE by mapping the pilot signal sent by the active RIS array element to a time-frequency resource corresponding to the active RIS array element.

In an embodiment of the present disclosure, mapping the pilot signal sent by the active RIS array to a corresponding time-frequency resource specifically refers to mapping the pilot signal sent by the active RIS array to a subcarrier corresponding to the active RIS array element, so as to send the pilot signal to the UE by using the subcarrier.

Furthermore, in an embodiment of the present disclosure, the RIS array may further send position information to the UE. The position information is configured to indicate a position of the active RIS array element in the RIS array, so that the UE may subsequently receive pilot signals sent by individual active RIS array elements according to the position information.

In summary, in the method for sending the signal provided in the embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring a stability of a pilot signal transmission. Meanwhile, when a channel estimation is subsequently performed based on the pilot signal, an accuracy of the channel estimation may be ensured.

Figure 2A:
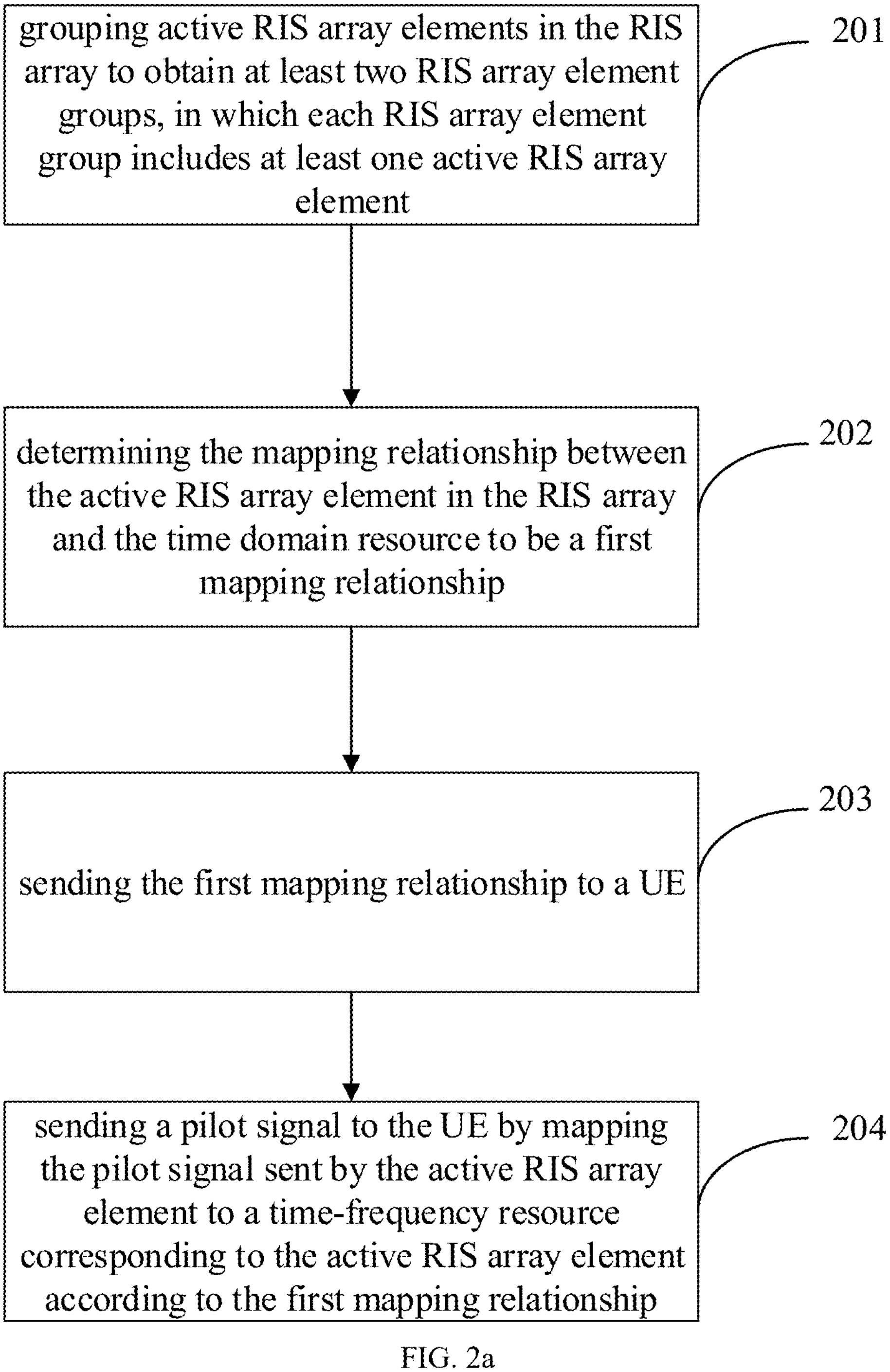
FIG. 2A is a flowchart of a method for sending a signal provided by another embodiment of the present disclosure.

FIG. 2A is a flowchart of a method for sending a signal provided by an embodiment of the present disclosure, which is applied to an RIS array. As shown in FIG. 2A, the method for sending the signal may include the following steps.

In step 201, active RIS array elements in the RIS array are grouped to obtain at least two RIS array element groups, and each RIS array element group includes at least one active RIS array element.

In an embodiment of the present disclosure, grouping the active RIS array elements in the RIS array may include at least one of following manners.

Figure 2B:
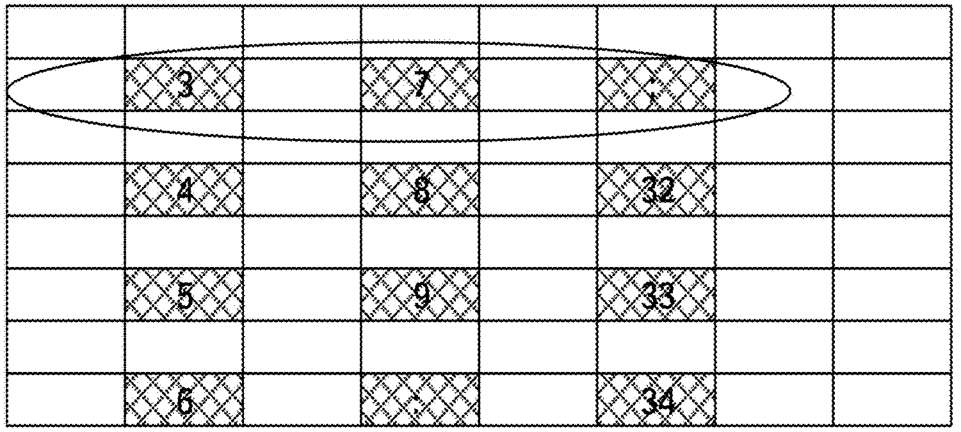
FIG. 2B is a schematic diagram of grouping active RIS array elements by rows provided by an embodiment of the present disclosure.

In manner 1, active RIS array elements located in a same row are grouped (i.e., grouped by rows) into a same RIS array element group. FIG. 2B is a schematic diagram of grouping active RIS array elements by rows provided by an embodiment of the present disclosure. As shown in FIG. 2B, active RIS array elements 1, 5, and 9 are grouped into a first RIS array element group, and active RIS array elements 2, 6, and 10 are grouped into a second RIS array element group, and so on.

Figure 2C:
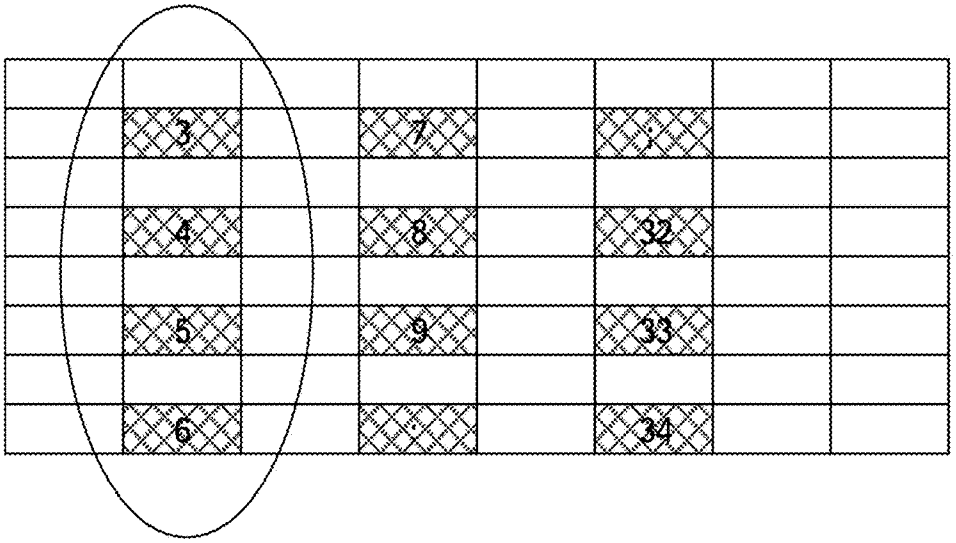
FIG. 2C is a schematic diagram of grouping active RIS array elements by columns provided by an embodiment of the present disclosure.

In manner 2, active RIS array elements located in a same column are grouped (i.e., grouped by columns) into a same RIS array element group. FIG. 2C is a schematic diagram of grouping active RIS array elements by columns provided by an embodiment of the present disclosure. As shown in FIG. 2C, active RIS array elements 1, 2, 3, and 4 are grouped into a first RIS array element group, and active RIS array elements 5, 6, 7, and 8 are grouped into a second RIS array element group, and so on.

In step 202, the mapping relationship between the active RIS array element in the RIS array and the time domain resource is determined to be a first mapping relationship.

In an embodiment of the present disclosure, the first mapping relationship may include: individual active RIS array elements in a same RIS array element group being mapped to different subcarriers of one OFDM symbol of the time domain resource, and different RIS array element groups being mapped to different OFDM symbols.

It should be noted that, in an embodiment of the present disclosure, the above different RIS array element groups being mapped to different OFDM symbols may include followings.

In a first case, i-th active RIS array elements in different RIS array element groups are mapped to same subcarriers of different OFDM symbols, where i is a positive integer.

Figure 2D:
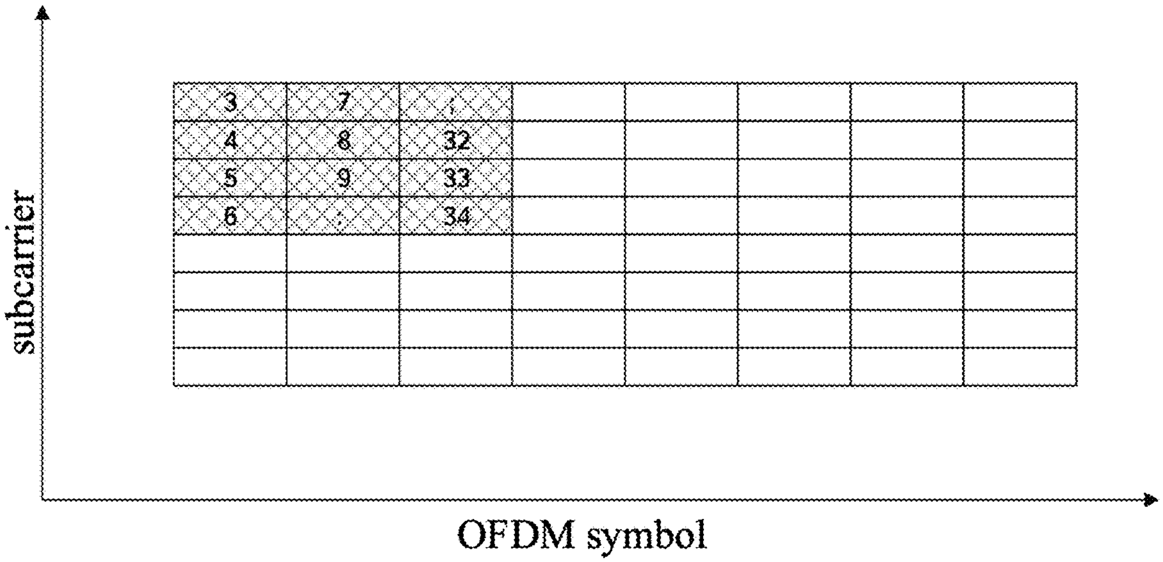
FIG. 2D is a schematic diagram of a first mapping relationship corresponding to a first case provided by an embodiment of the present disclosure.

FIG. 2D is a schematic diagram of a first mapping relationship corresponding to the first case as described above provided by an embodiment of the present disclosure. As shown in FIG. 2D, the active RIS array elements are grouped by columns. The active RIS array elements 1, 2, 3, and 4 belonging to the first RIS array element group are mapped to different subcarriers of a first OFDM symbol, and the active RIS array elements 5, 6, 7, and 8 belonging to the second RIS array element group are mapped to different subcarriers of a second OFDM symbol, and a first active RIS array element (i.e., the element 1) in the first RIS array element group is mapped to a first subcarrier of the first OFDM symbol, and a first active RIS array element (i.e., the element 5) in the second RIS array element group is mapped to a first subcarrier of the second OFDM symbol. That is, the i-th active RIS array elements in different RIS array element groups are mapped to the same subcarriers of different OFDM symbols.

In a second case, i-th active RIS array elements in different RIS array element groups are mapped to different subcarriers of different OFDM symbols, where i is a positive integer.

Figure 2E:
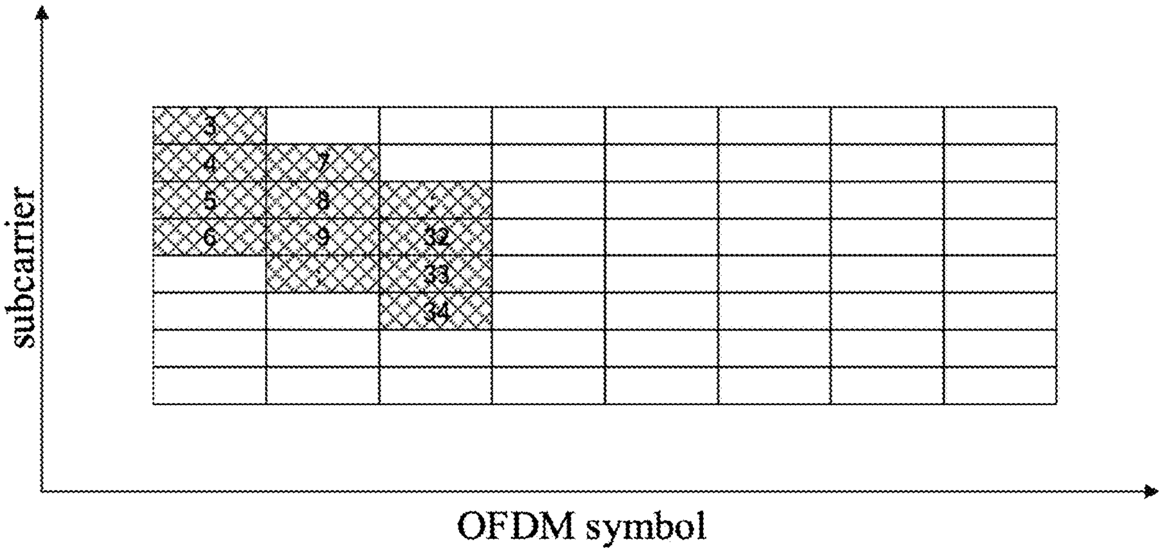
FIG. 2E is a schematic diagram of a first mapping relationship corresponding to a second case provided by an embodiment of the present disclosure.

FIG. 2E is a schematic diagram of the first mapping relationship corresponding to the second case as described above provided by an embodiment of the present disclosure. As shown in FIG. 2E, the active RIS array elements are grouped by columns. The active RIS array elements 1, 2, 3, and 4 belonging to the first RIS array element group are mapped to different subcarriers of a first OFDM symbol, and the active RIS array elements 5, 6, 7, and 8 belonging to the second RIS array element group are mapped to different subcarriers of a second OFDM symbol, and a first active RIS array element (i.e., the element 1) in the first RIS array element group is mapped to a first subcarrier of the first OFDM symbol, and a first active RIS array element (i.e., the element 5) in the second RIS array element group is mapped to a second subcarrier of the second OFDM symbol. That is, the i-th active RIS array elements in different RIS array element groups are mapped to different subcarriers of different OFDM symbols.

In step 203, the first mapping relationship is sent to a UE.

In step 204, a pilot signal is sent to the UE by mapping the pilot signal sent by the active RIS array element to a time-frequency resource corresponding to the active RIS array element according to the first mapping relationship.

It should be noted that, in an embodiment of the present disclosure, a pilot signal sent by one active RIS array element may occupy one or more subcarriers.

Specifically, in an embodiment of the present disclosure, the pilot signal sent by the one active RIS array element may occupy only one subcarrier. At this time, there is one subcarrier mapped by the one active RIS array element (for example, as shown in FIGS. 2D and 2E).

In an embodiment of the present disclosure, the pilot signal sent by the one active RIS array element may occupy n subcarriers. At this time, there are n subcarriers mapped by the one active RIS array element, where n is a positive integer greater than 1.

Figure 2F:
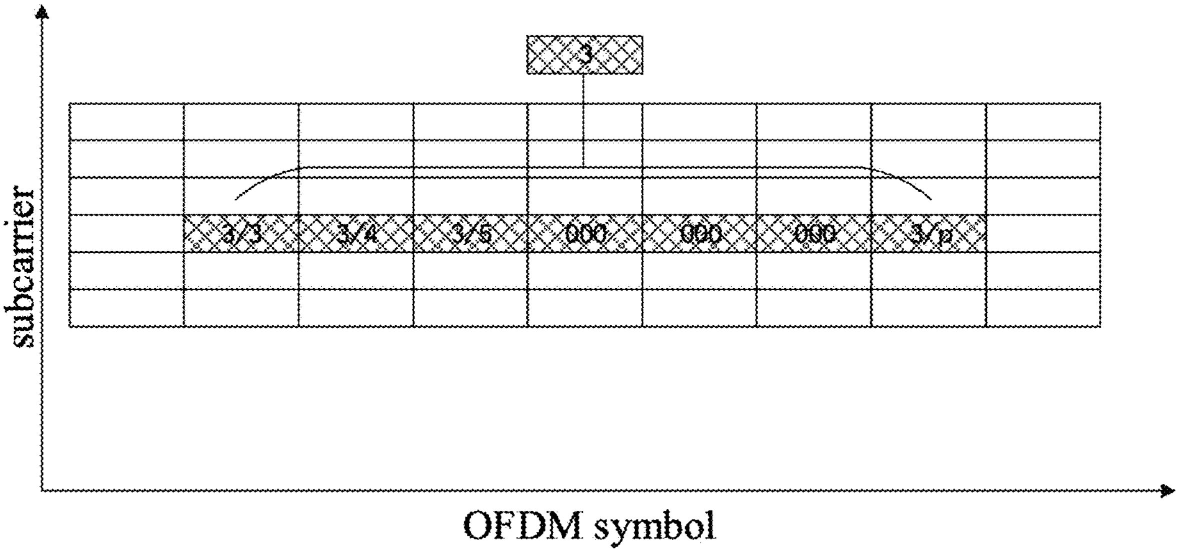
FIG. 2F is a schematic diagram of one active RIS array element corresponding to n subcarriers provided by an embodiment of the present disclosure.

Further, it should be noted that, in an embodiment of the present disclosure, when there are n subcarriers mapped by the one active RIS array element, the n subcarriers mapped by the one active RIS array element may belong to different OFDM symbols. When the n subcarriers belong to different OFDM symbols, positions of the n subcarriers in different OFDM symbols may be the same or different. For example, FIG. 2F is a schematic diagram of one active RIS array element corresponding to n subcarriers provided by an embodiment of the present disclosure. As shown in FIG. 2F, active RIS array element 1 corresponds to subcarrier 1-1, subcarrier 1-2, . . . , and subcarrier 1-*n*. The subcarrier 1-1 to the subcarrier 1-*n* belong to different OFDM symbols, and positions of the subcarriers in different OFDM symbols are the same. That is, the subcarrier 1-1 is a second subcarrier of a second OFDM symbol, and the subcarrier 1-2 is a second subcarrier of a third OFDM symbol.

Figure 2G:
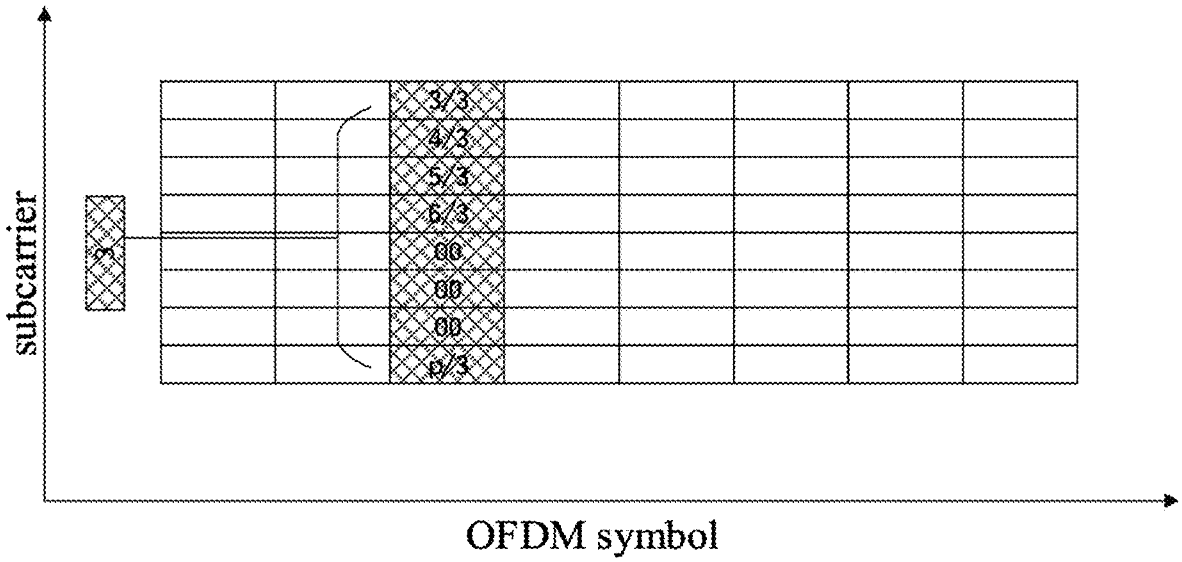
FIG. 2G is a schematic diagram of one active RIS array element corresponding to n subcarriers provided by an embodiment of the present disclosure.

In another embodiment of the present disclosure, when there are n subcarriers mapped by the one active RIS array element, the n subcarriers mapped by the one active RIS array element may belong to the same OFDM symbol. For example, FIG. 2G is a schematic diagram of one active RIS array element corresponding to n subcarriers provided by an embodiment of the present disclosure. As shown in FIG. 2G, active RIS array element 1 corresponds to subcarrier 1-1, subcarrier 2-1, . . . , and subcarrier n-1. The subcarrier 1-1 to the subcarrier n-1 belong to the same OFDM symbol.

Figure 2H:
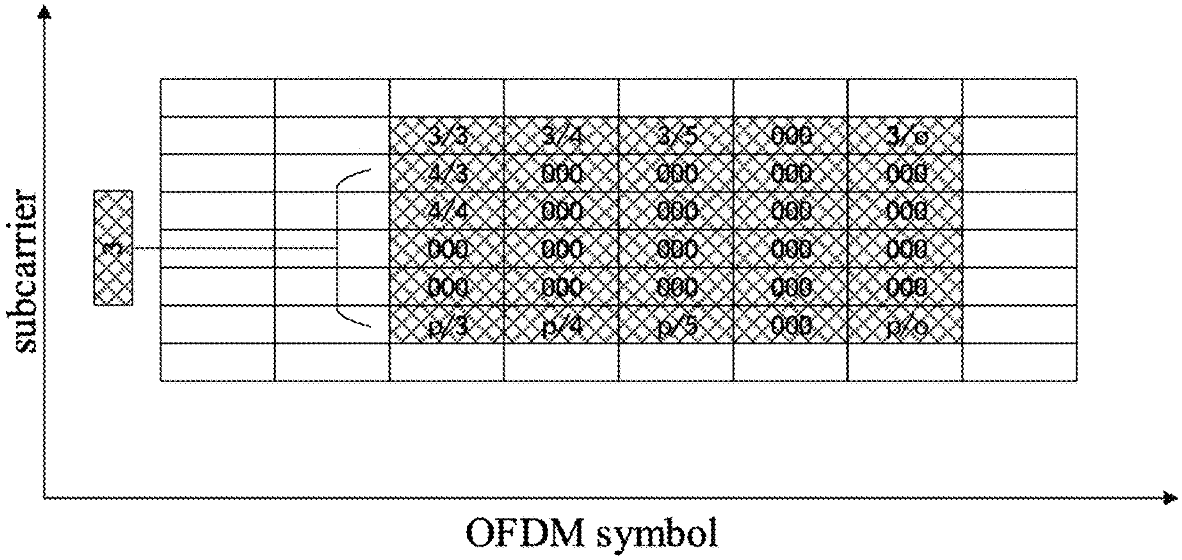
FIG. 2H is a schematic diagram of one active RIS array element corresponding to n×m subcarriers provided by an embodiment of the present disclosure.

Furthermore, in an embodiment of the present disclosure, the pilot signal sent by the one active RIS array element occupies n×m subcarriers. At this time, there are n×m subcarriers mapped by the one active RIS array element, where n and m are both positive integers. Further, FIG. 2H is a schematic diagram of one active RIS array element corresponding to n×m subcarriers provided by an embodiment of the present disclosure.

In addition, it should be noted that the mapping relationships in the embodiments are described in a case where one active RIS array corresponds to one subcarrier. When one active RIS array corresponds to a plurality of subcarriers, it may also be mapped according to the mapping relationships mentioned in the embodiments of the present disclosure.

In summary, in the method for sending the signal provided in embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation can be ensured.

Figure 3A:
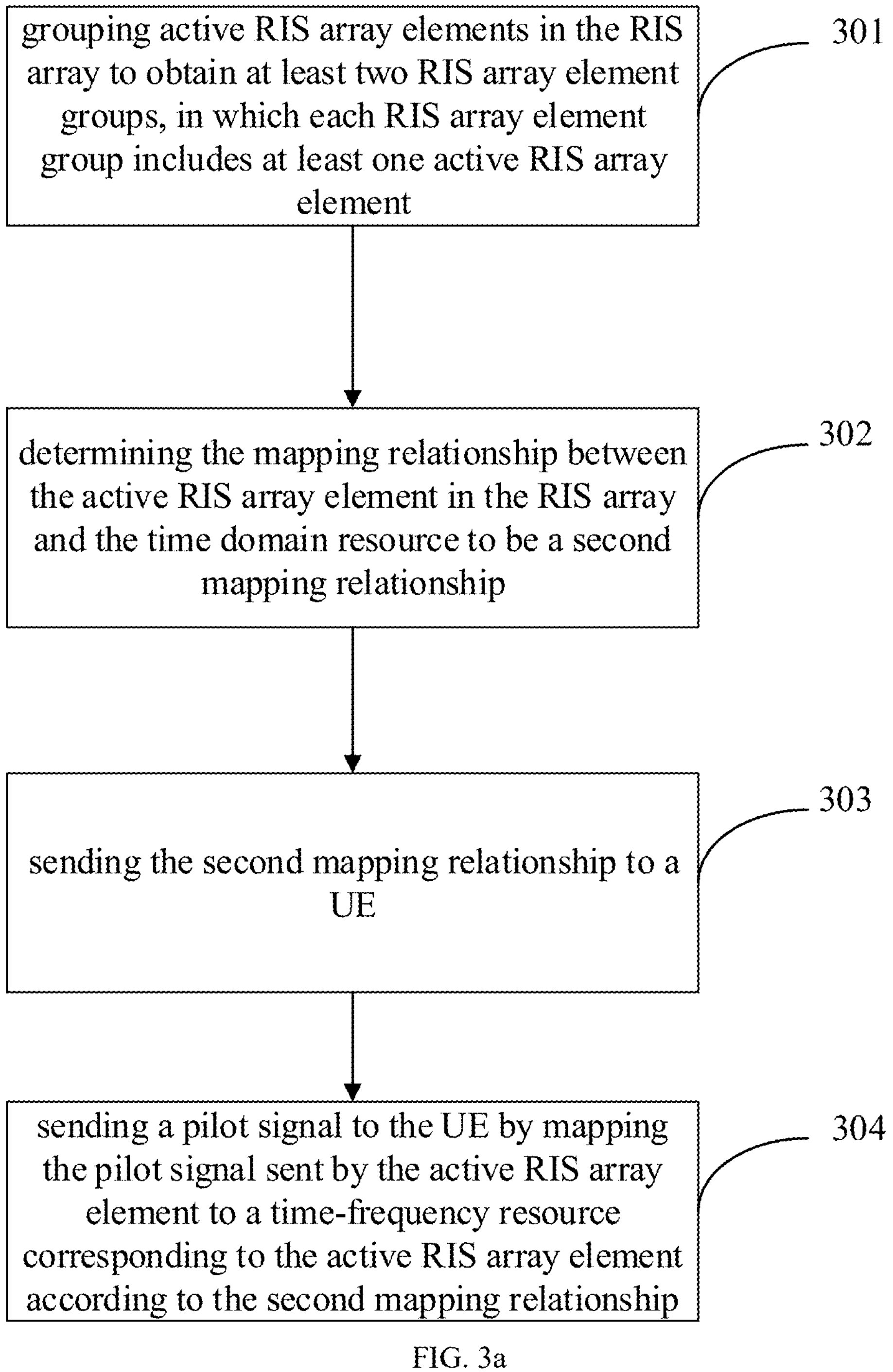
FIG. 3A is a flowchart of a method for sending a signal provided by yet another embodiment of the present disclosure.

FIG. 3A is a flowchart of a method for sending a signal provided by an embodiment of the present disclosure, which is applied to an RIS array. As shown in FIG. 3A, the method for sending the signal may include the following steps.

In step 301, active RIS array elements in the RIS array are grouped to obtain at least two RIS array element groups, and each RIS array element group includes at least one active RIS array element.

For relevant introduction of the step 301, reference may be made to description of the above embodiments, which will not be repeated here.

In step 302, the mapping relationship between the active RIS array element in the RIS array and the time domain resource is determined to be a second mapping relationship.

In an embodiment of the present disclosure, the second mapping relationship may include: individual active RIS array elements in a same RIS array element group being mapped to different OFDM symbols of the time domain resource, the individual active RIS array elements in the same RIS array element group being mapped to same subcarriers of different OFDM symbols, and different RIS array element groups being mapped to different subcarriers.

Further, in an embodiment of the present disclosure, the above different RIS array element groups being mapped to different subcarriers includes at least one of followings.

In a third case, subcarriers mapped by i-th active RIS array elements in different RIS array element groups belong to a same OFDM symbol, where i is a positive integer.

Figure 3B:
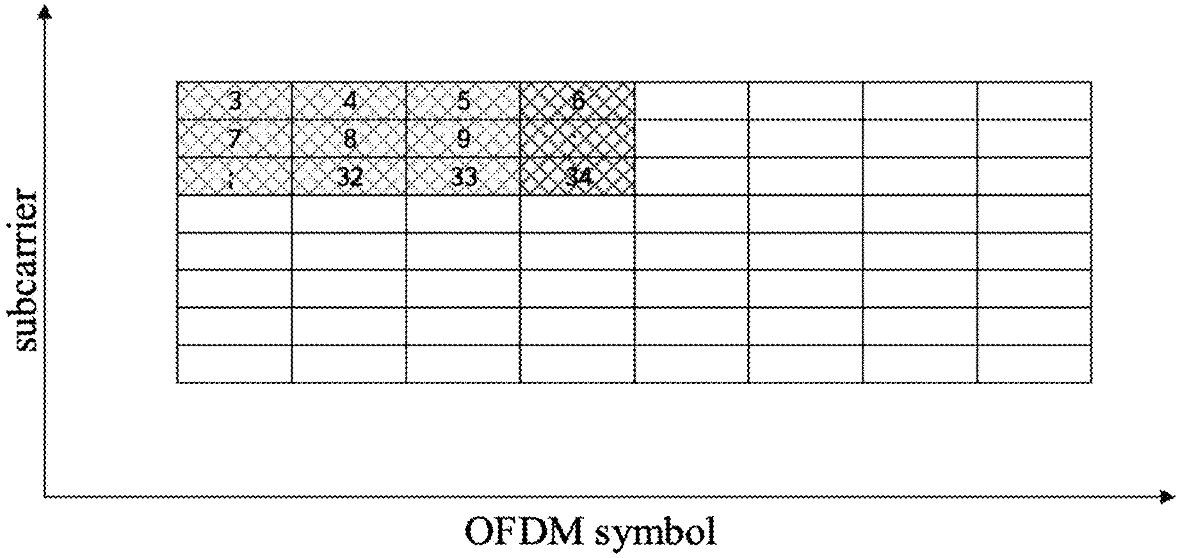
FIG. 3B is a schematic diagram of a second mapping relationship corresponding to a third case provided by an embodiment of the present disclosure.

FIG. 3B is a schematic diagram of the second mapping relationship corresponding to the third case as described above provided by an embodiment of the present disclosure. As shown in FIG. 3B, the active RIS array elements are grouped by columns. Active RIS array elements 1, 2, 3, and 4 belonging to a first RIS array element group are respectively mapped to different OFDM symbols, and individual active RIS array elements in the same RIS array element group are mapped to same subcarriers of different OFDM symbols. The active RIS array element 1 is mapped to a first subcarrier of a first OFDM symbol, the active RIS array element 2 is mapped to a first subcarrier of a second OFDM symbol, the active RIS array element 3 is mapped to a first subcarrier of a third OFDM symbol, and the active RIS array element 4 is mapped to a first subcarrier of a fourth OFDM symbol. At the same time, the subcarriers mapped to the i-th active RIS array elements in different RIS array element groups belong to the same OFDM symbol, that is, a first active RIS array element (i.e., the element 1) in the first RIS array element group is mapped to a subcarrier of the first OFDM symbol, and a first active RIS array element (i.e., the element 5) in a second RIS array element group is mapped to a subcarrier of the first OFDM symbol.

In a fourth case, subcarriers mapped by i-th active RIS array elements in different RIS array element groups belong to different OFDM symbols, where i is a positive integer.

Figure 3C:
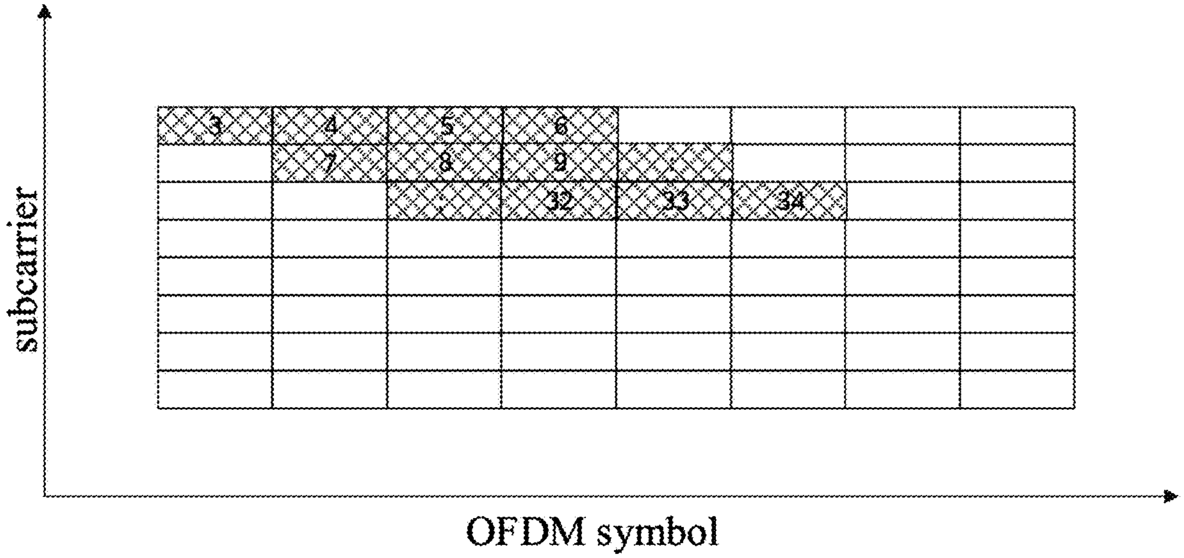
FIG. 3C is a schematic diagram of a second mapping relationship corresponding to a fourth case provided by an embodiment of the present disclosure.

FIG. 3C is a schematic diagram of the second mapping relationship corresponding to the fourth case as described above provided by an embodiment of the present disclosure. As shown in FIG. 3C, the active RIS array elements are grouped by columns. Active RIS array elements 1, 2, 3, and 4 belonging to a first RIS array element group are respectively mapped to different OFDM symbols, and individual active RIS array elements in the same RIS array element group are mapped to same subcarriers of different OFDM symbols. The active RIS array element 1 is mapped to a first subcarrier of a first OFDM symbol, the active RIS array element 2 is mapped to a first subcarrier of a second OFDM symbol, the active RIS array element 3 is mapped to a first subcarrier of a third OFDM symbol, and the active RIS array element 4 is mapped to a first subcarrier of a fourth OFDM symbol. At the same time, the subcarriers mapped by the i-th active RIS array elements in different RIS array element groups belong to different OFDM symbols, that is, a first active RIS array element (i.e., the element 1) in the first RIS array element group is mapped to a subcarrier of the first OFDM symbol, and a first active RIS array element (i.e., the element 5) in a second RIS array element group is mapped to a subcarrier of the second OFDM symbol.

In step 303, the second mapping relationship is sent to a UE.

In step 304, a pilot signal is sent to the UE by mapping the pilot signal sent by the active RIS array element to a time-frequency resource corresponding to the active RIS array element according to the second mapping relationship.

For relevant introduction of the step 304, reference may be made to description of the above embodiments, which will not be repeated here.

In summary, in the method for sending the signal provided in the embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 4A:
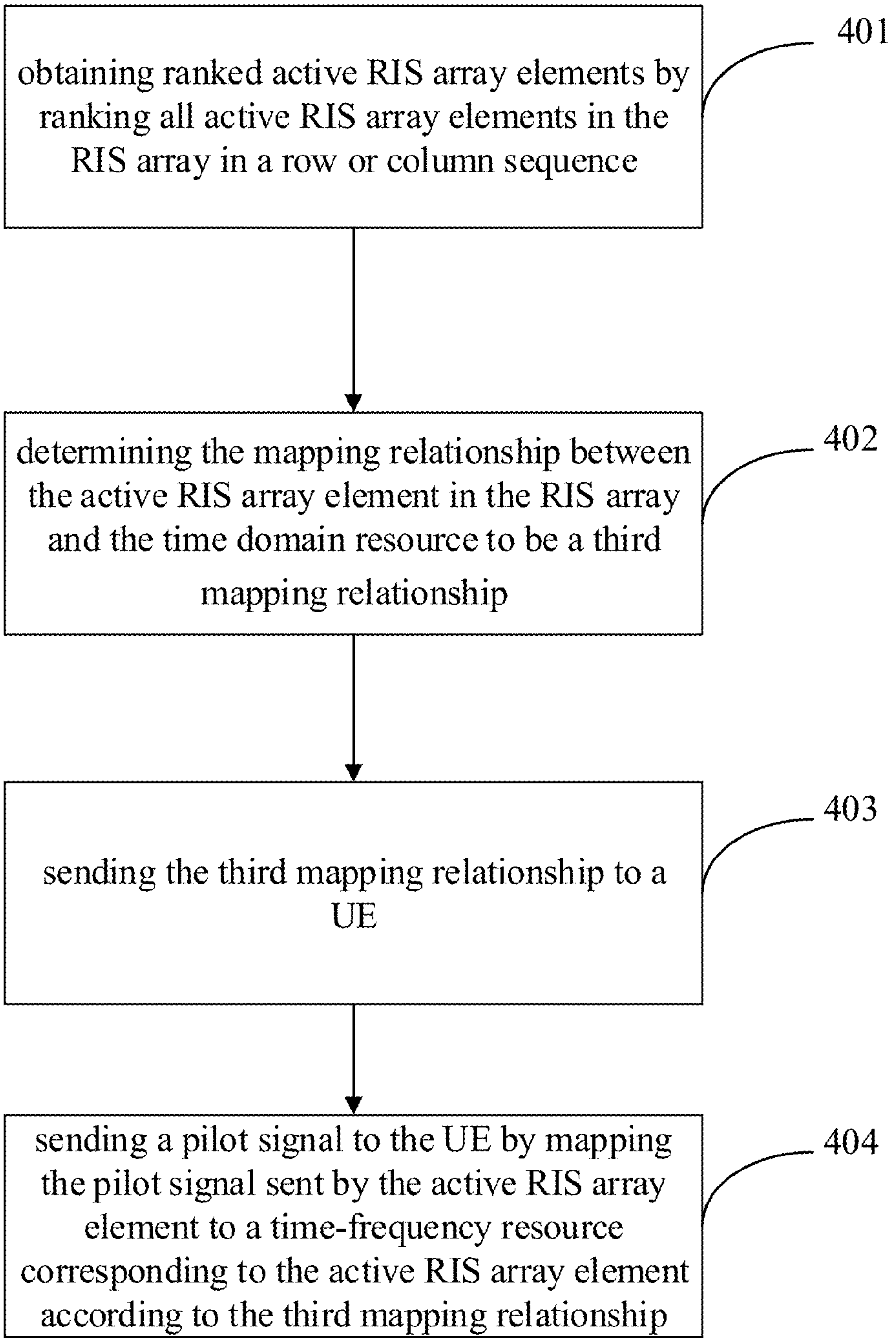
FIG. 4A is a flowchart of a method for sending a signal provided by an embodiment of the present disclosure.

FIG. 4A is a flowchart of a method for sending a signal provided by an embodiment of the present disclosure, which is applied to an RIS array. As shown in FIG. 4A, the method for sending the signal may include the following steps.

In step 401, ranked active RIS array elements are obtained by ranking all active RIS array elements in the RIS array in a row or column sequence.

For example, after all active RIS array elements shown in FIG. 1B are ranked in the columns sequence, active RIS array elements 1, 2, 3, 4, 5, 6, 7, 8, 9, 10, 11, and 12 are obtained. After all active RIS array elements shown in FIG. 1B are ranked in the row sequence, active RIS array elements 1, 5, 9, 2, 6, 10, 3, 7, 11, 4, 8, and 12 are obtained.

In step 402, the mapping relationship between the active RIS array element in the RIS array and the time domain resource is determined to be a third mapping relationship.

In an embodiment of the present disclosure, the third mapping relationship includes: the ranked active RIS array elements being mapped to different subcarriers of a same OFDM symbol, and/or the ranked active RIS array elements being mapped to same subcarriers of different OFDM symbols, and/or the ranked active RIS array elements being mapped to different subcarriers of different OFDM symbols.

Figure 4B:
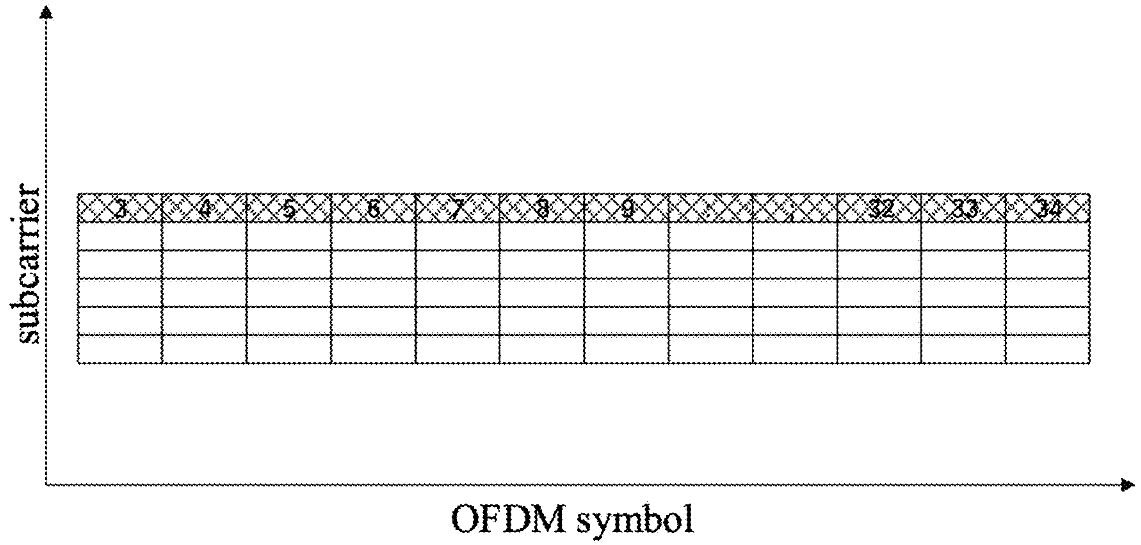
FIG. 4B is a schematic diagram of a third mapping relationship provided by an embodiment of the present disclosure.
Figure 4C:
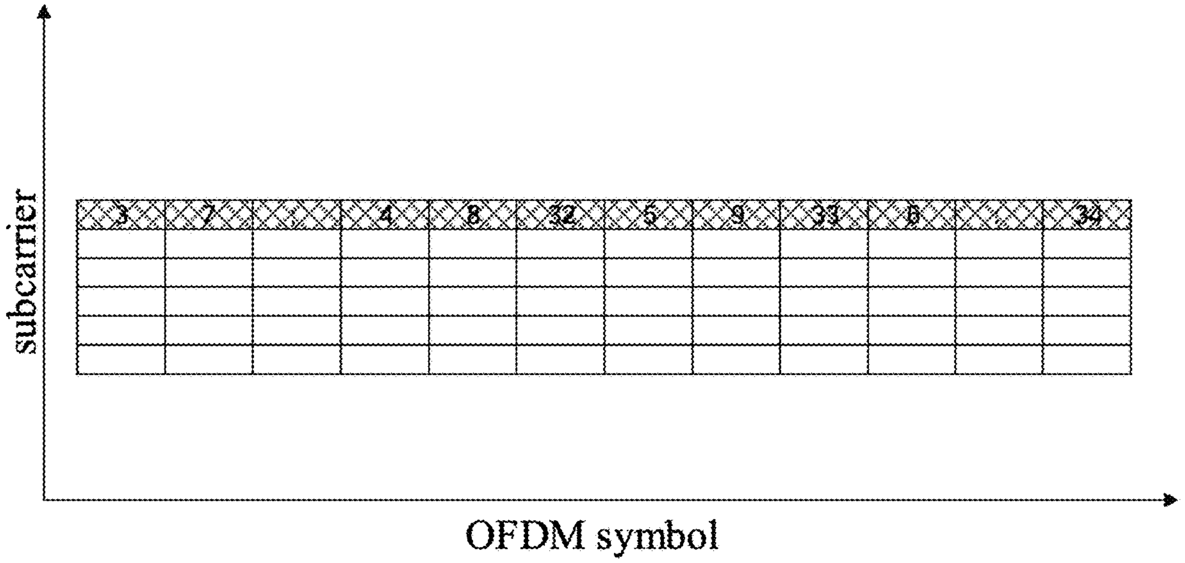
FIG. 4C is a schematic diagram of a third mapping relationship provided by an embodiment of the present disclosure.
Figure 4D:
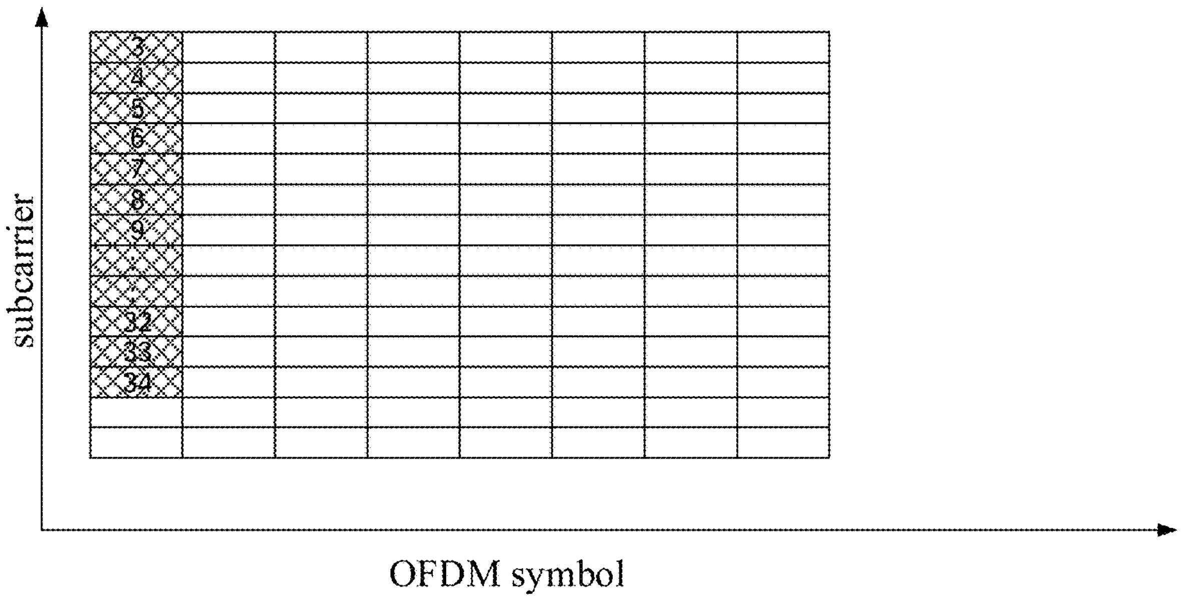
FIG. 4D is a schematic diagram of a third mapping relationship provided by an embodiment of the present disclosure.
Figure 4E:
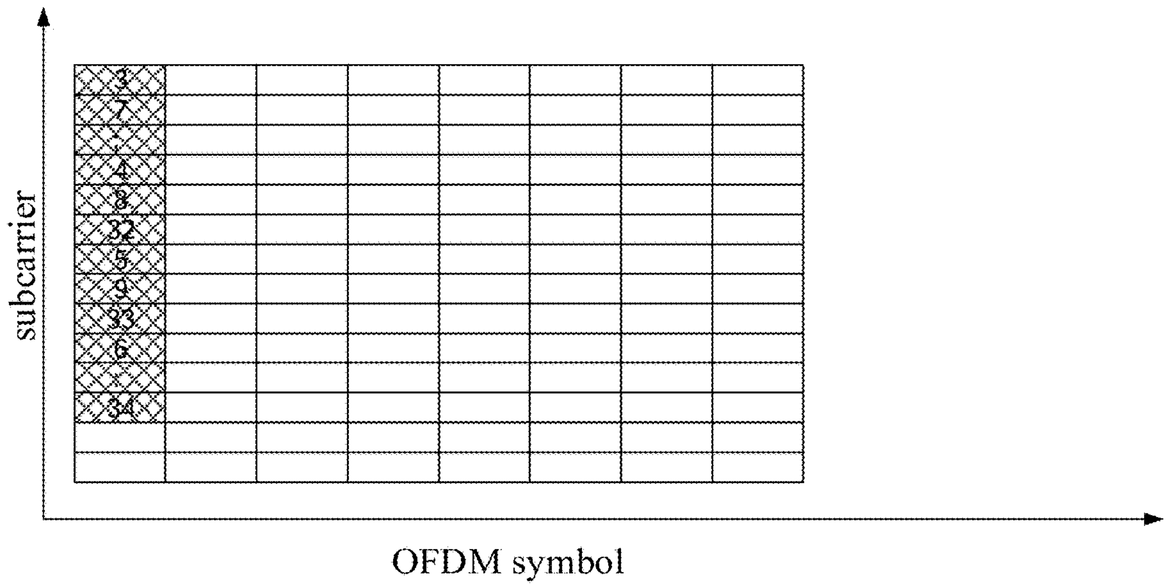
FIG. 4E is a schematic diagram of a third mapping relationship provided by another embodiment of the present disclosure.

FIG. 4B is a schematic diagram of the third mapping relationship provided by an embodiment of the present disclosure. As shown in FIG. 4B, all active RIS array elements ranked in the column sequence are respectively mapped to same subcarriers of different OFDM symbols. FIG. 4C is a schematic diagram of the third mapping relationship provided by an embodiment of the present disclosure. As shown in FIG. 4C, all active RIS array elements ranked in the row sequence are respectively mapped to same subcarriers of different OFDM symbols. FIG. 4D is a schematic diagram of the third mapping relationship provided by an embodiment of the present disclosure. As shown in FIG. 4D, all active RIS array elements ranked in the column sequence are respectively mapped to different subcarriers of the same OFDM symbol. FIG. 4E is a schematic diagram of the third mapping relationship provided by an embodiment of the present disclosure. As shown in FIG. 4E, all active RIS array elements ranked in the row sequence are respectively mapped to different subcarriers of the same OFDM symbol.

In step 403, the third mapping relationship is sent to a UE.

In step 404, a pilot signal is sent to the UE by mapping the pilot signal sent by the active RIS array element to a time-frequency resource corresponding to the active RIS array element according to the third mapping relationship.

For relevant introduction of the step 404, reference may be made to description of the above embodiments, which will not be repeated here.

In summary, in the method for sending the signal provided in the embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 5A:
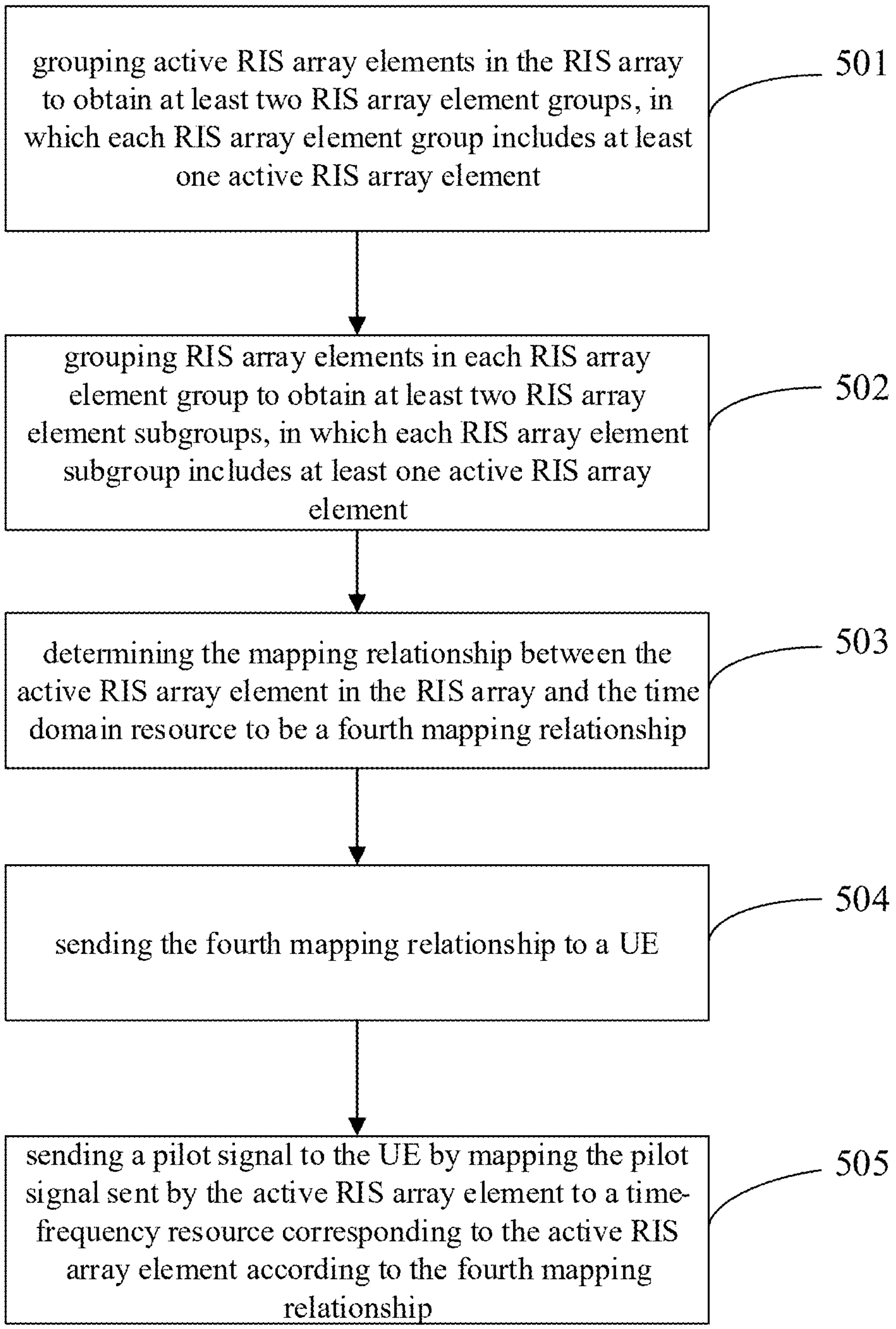
FIG. 5A is a flowchart of a method for sending a signal provided by a further embodiment of the present disclosure.

FIG. 5A is a flowchart of a method for sending a signal provided by an embodiment of the present disclosure, which is applied to an RIS array. As shown in FIG. 5A, the method for sending the signal may include the following steps.

In step 501, active RIS array elements in the RIS array are grouped to obtain at least two RIS array element groups, and each RIS array element group includes at least one active RIS array element.

For relevant introduction of the step 501, reference may be made to description of the above embodiments, which will not be repeated here.

In step 502, RIS array elements in each RIS array element group are grouped to obtain at least two RIS array element subgroups, and each RIS array element subgroup includes at least one active RIS array element.

For example, in an embodiment of the present disclosure, for example, active RIS array elements 1 and 2 in a first RIS array element group may be grouped into a first RIS array element subgroup, and active RIS array elements 3 and 4 in the first RIS array element group may be grouped into a second RIS array element subgroup. On this basis, each array element group is divided into at least two RIS array element subgroups.

In step 503, the mapping relationship between the active RIS array element in the RIS array and the time domain resource is determined to be a fourth mapping relationship.

In an embodiment of the present disclosure, the fourth mapping relationship includes: different RIS array element subgroups being mapped to different OFDM symbols, and i-th RIS array element subgroups of different RIS array element groups being mapped to same subcarriers of different OFDM symbols, where i is a positive integer.

Figure 5B:
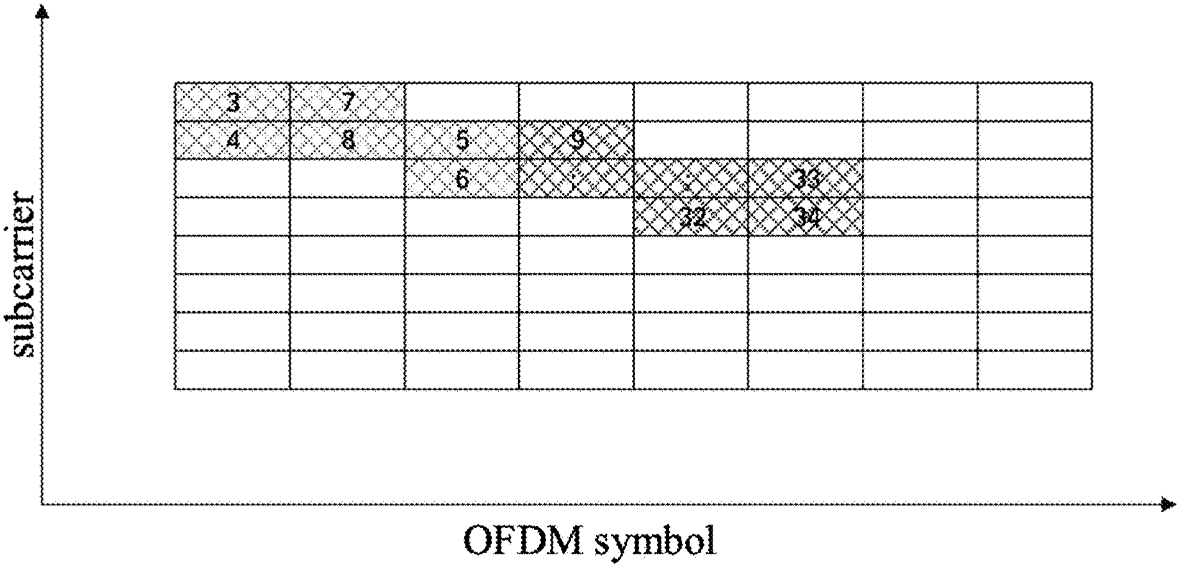
FIG. 5B is a schematic diagram of a fourth mapping relationship provided by an embodiment of the present disclosure.

FIG. 5B is a schematic diagram of the fourth mapping relationship provided by an embodiment of the present disclosure. As shown in FIG. 5B, different RIS array element subgroups in the first RIS array element group (1, 2, 3, 4) are mapped to different OFDM symbols. Specifically, the first RIS array element subgroup (1, 2) in the first RIS array element group is mapped to a first OFDM symbol, the first RIS array element subgroup (3, 4) in the first RIS array element group is mapped to a third OFDM symbol, a first RIS array element subgroup (5, 6) in a second RIS array element group (5, 6, 7, 8) is mapped to a second OFDM symbol, a second RIS array element subgroup (7, 8) in the second RIS array element group is mapped to a fourth OFDM symbol, and the i-th RIS array element subgroups of different RIS array element groups are mapped to same subcarriers of different OFDM symbols. That is, the first RIS array element subgroup (1, 2) in the first RIS array element subgroup (1, 2, 3, 4) is mapped to a first subcarrier and a second subcarrier of the first OFDM symbol, and the first RIS array element subgroup (5, 6) in the second RIS array element group (5, 6, 7, 8) is mapped to a first subcarrier and a second subcarrier of the second OFDM symbol.

In step 504, the fourth mapping relationship is sent to a UE.

In step 505, a pilot signal is sent to the UE by mapping the pilot signal sent by the active RIS array element to a time-frequency resource corresponding to the active RIS array element according to the fourth mapping relationship.

For relevant introduction of the step 505, reference may be made to description of the above embodiments, which will not be repeated here.

In summary, in the method for sending the signal provided in the embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 6A:
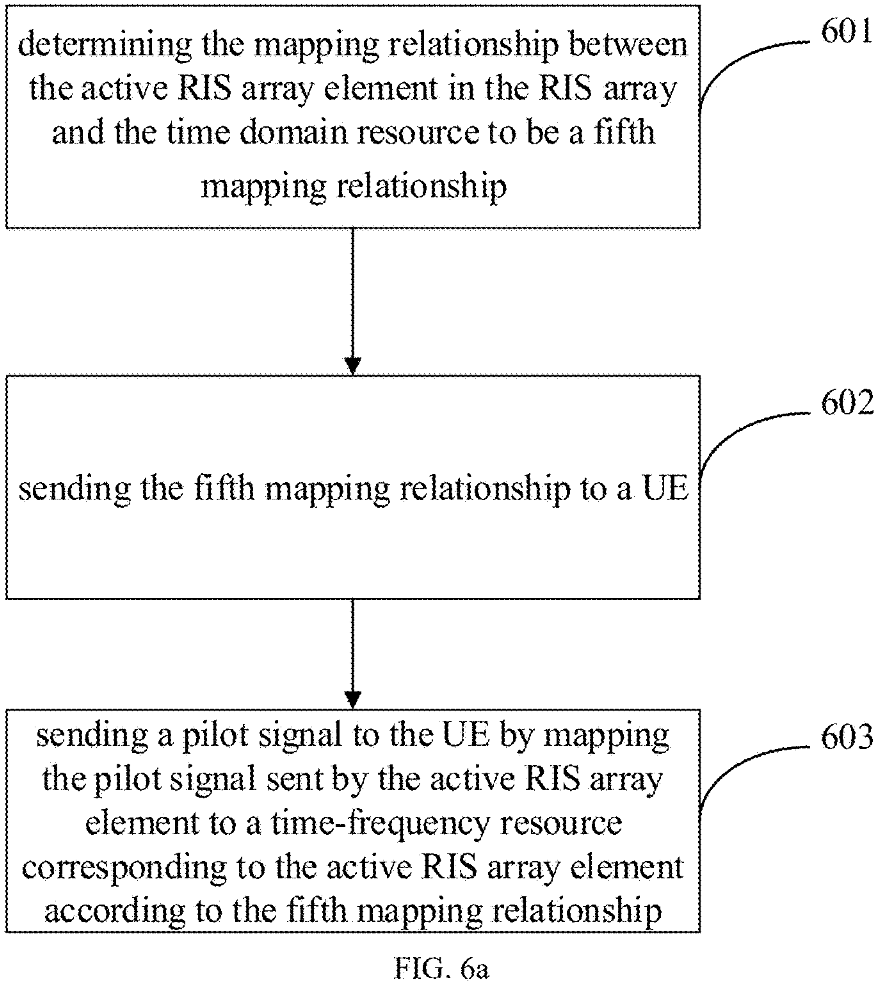
FIG. 6A is a flowchart of a method for sending a signal provided by a further embodiment of the present disclosure.

FIG. 6A is a flowchart of a method for sending a signal provided by an embodiment of the present disclosure, which is applied to an RIS array. As shown in FIG. 6A, the method for sending the signal may include the following steps.

In step 601, the mapping relationship between the active RIS array element in the RIS array and the time domain resource is determined to be a fifth mapping relationship.

In an embodiment of the present disclosure, the fifth mapping relationship includes: active RIS array elements being mapped to subcarriers of the time domain resource according to a spatial position arrangement of the active RIS array elements in the RIS array.

Figure 6B:
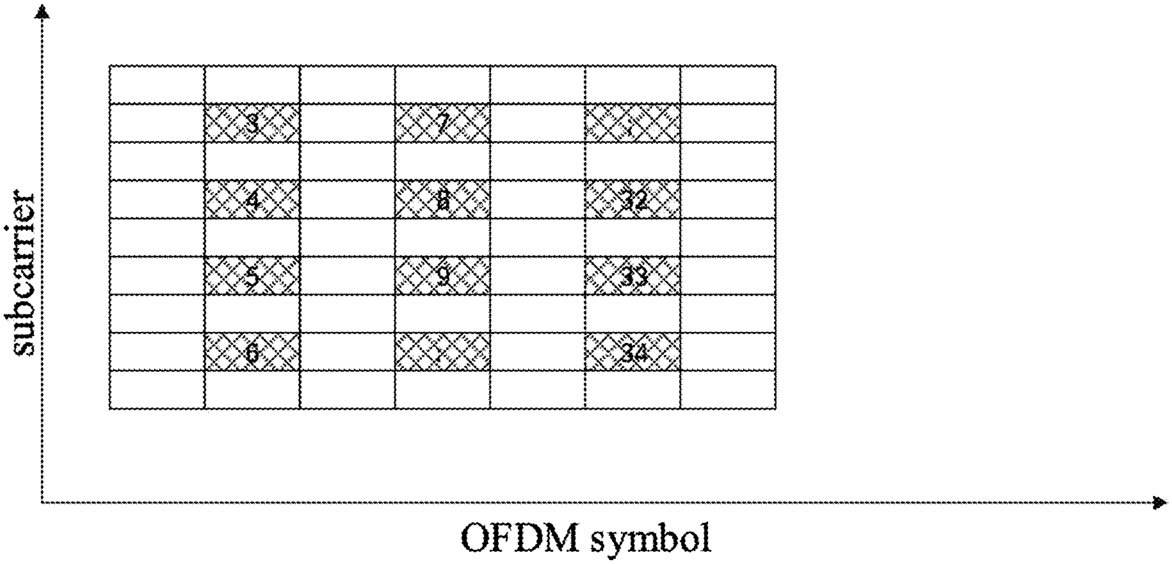
FIG. 6B is a schematic diagram of a fifth mapping relationship provided by an embodiment of the present disclosure.

FIG. 6B is a schematic diagram of the fifth mapping relationship provided by an embodiment of the present disclosure. As shown in FIG. 6B, the active RIS array elements may be directly mapped to subcarriers according to the spatial position arrangement of the active RIS array elements in the RIS array in FIG. 1B. For example, referring to FIG. 1B, it may be seen that a spatial position of the active RIS array element 1 in the RIS array is at a 2nd row and a 2nd column, and a spatial position of a subcarrier mapped to the active RIS array element 1 in the time domain resource is determined to be at a 2nd row and a 2nd column.

In step 602, the fifth mapping relationship is sent to a UE.

In step 603, a pilot signal is sent to the UE by mapping the pilot signal sent by the active RIS array element to a time-frequency resource corresponding to the active RIS array element according to the fifth mapping relationship.

For relevant introduction of the step 603, reference may be made to description of the above embodiments, which will not be repeated here.

In summary, in the method for sending the signal provided in the embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 7:
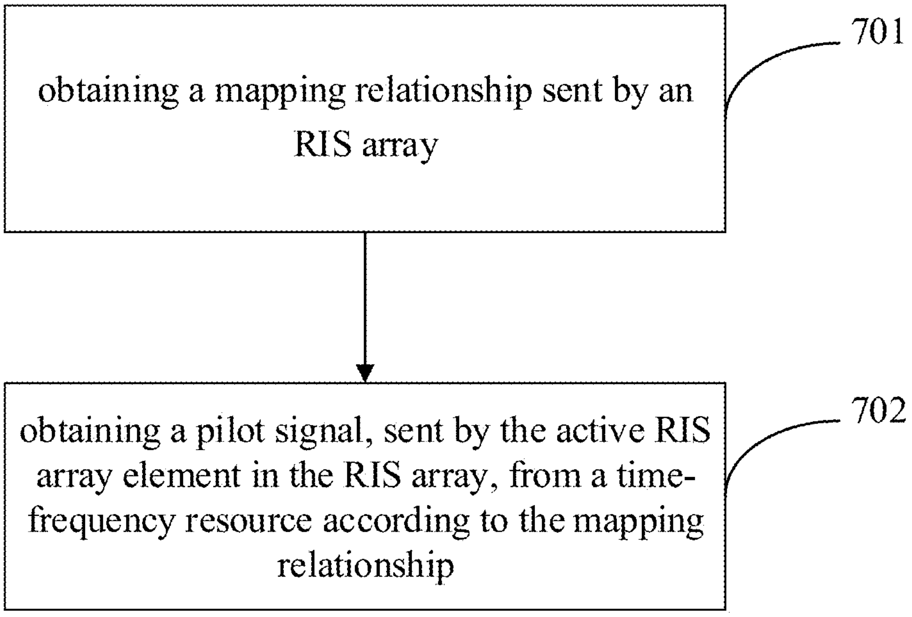
FIG. 7 is a flowchart of a method for sending a signal provided by a further embodiment of the present disclosure.

FIG. 7 is a flowchart of a method for sending a signal provided by an embodiment of the present disclosure, which is performed by a UE. As shown in FIG. 7, the method for sending the signal may include the following steps.

In step 701, a mapping relationship sent by an RIS array is obtained. The mapping relationship is between an active RIS array element in the RIS array and a time domain resource.

In step 702, a pilot signal sent by the active RIS array element in the RIS array is obtained from a time-frequency resource according to the mapping relationship.

Further, in an embodiment of the present disclosure, the UE may further obtain position information sent by a base station. The position information is configured to indicate a position of the active RIS array element in the RIS array. Afterwards, the UE may obtain the pilot signal, sent by the active RIS array element in the RIS array, from the time-frequency resource according to the position information and the received mapping relationship, so that the channel estimation may be subsequently performed according to the received pilot signal.

Further, for detailed introduction of the above steps 701 to 702, reference may be made to description of the above embodiments, which will not be repeated here.

In summary, in the method for sending the signal provided in the embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 8:
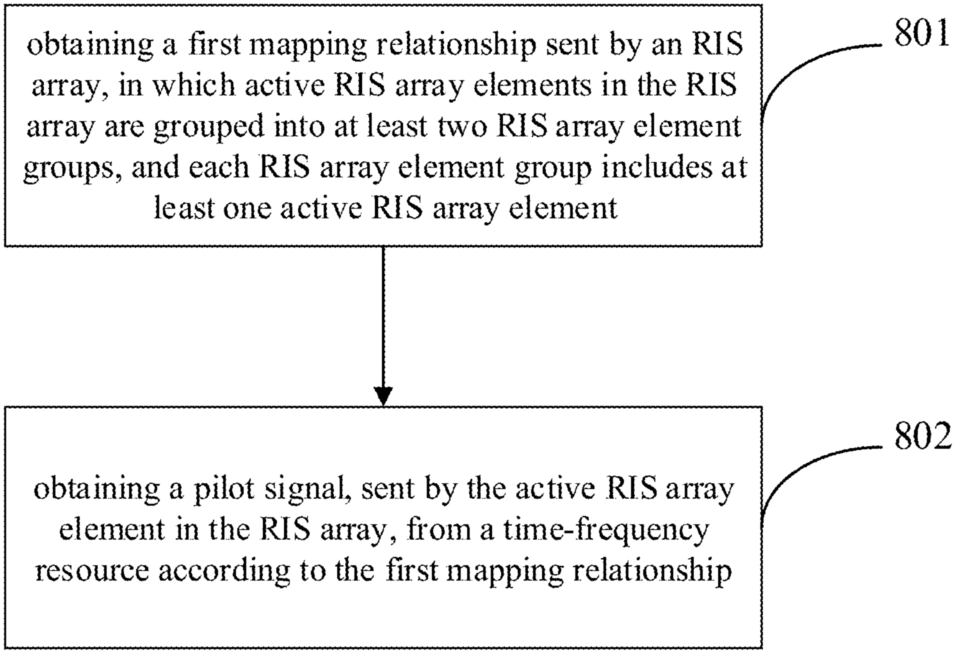
FIG. 8 is a flowchart of a method for sending a signal provided by a further embodiment of the present disclosure.

FIG. 8 is a flowchart of a method for sending a signal provided by an embodiment of the present disclosure, which is performed by a UE. As shown in FIG. 8, the method for sending the signal may include the following steps.

In step 801, a first mapping relationship sent by an RIS array is obtained, active RIS array elements in the RIS array are grouped into at least two RIS array element groups, and each RIS array element group includes at least one active RIS array element.

The first mapping relationship includes: individual active RIS array elements in a same RIS array element group being mapped to different subcarriers of one OFDM symbol of the time domain resource, and different RIS array element groups being mapped to different OFDM symbols.

In an embodiment of the present disclosure, different RIS array element groups being mapped to different OFDM symbols include: i-th active RIS array elements in different RIS array element groups being mapped to same subcarriers of different OFDM symbols, where i is a positive integer; or i-th active RIS array elements in different RIS array element groups being mapped to different subcarriers of different OFDM symbols, where i is a positive integer.

Further, an RIS array element group corresponding to a first mapping may include: individual active RIS array elements in a same RIS array element group being in a same row, or individual active RIS array elements in a same RIS array element group being in a same column.

In step 802, a pilot signal sent by the active RIS array element in the RIS array is obtained from a time-frequency resource according to the first mapping relationship.

In summary, in the method for sending the signal provided in the embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 9:
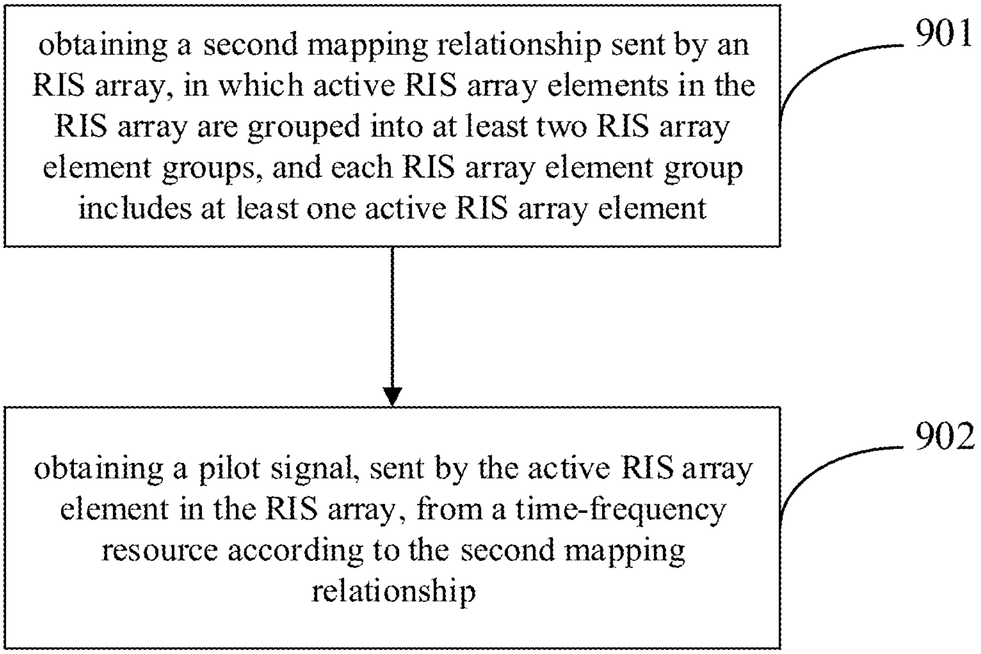
FIG. 9 is a flowchart of a method for sending a signal provided by a further embodiment of the present disclosure.

FIG. 9 is a flowchart of a method for sending a signal provided by an embodiment of the present disclosure, which is performed by a UE. As shown in FIG. 9, the method for sending the signal may include the following steps.

In step 901, a second mapping relationship sent by an RIS array is obtained, active RIS array elements in the RIS array are grouped into at least two RIS array element groups, and each RIS array element group includes at least one active RIS array element.

The second mapping relationship includes: individual active RIS array elements in a same RIS array element group being mapped to different OFDM symbols of the time domain resource, the individual active RIS array elements in the same RIS array element group being mapped to same subcarriers of different OFDM symbols, and different RIS array element groups being mapped to different subcarriers.

In an embodiment of the present disclosure, different RIS array element groups being mapped to different subcarriers include at least one of: subcarriers mapped by i-th active RIS array elements in different RIS array element groups belonging to a same OFDM symbol, where i is a positive integer; subcarriers mapped by i-th active RIS array elements in different RIS array element groups belonging to different OFDM symbols, where i is a positive integer.

Further, an RIS array element group corresponding to a second mapping may include: individual active RIS array elements in a same RIS array element group being in a same row, or individual active RIS array elements in a same RIS array element group being in a same column.

In step 902, a pilot signal sent by the active RIS array element in the RIS array is obtained from a time-frequency resource based on the second mapping relationship.

In summary, in the method for sending the signal provided in embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 10:
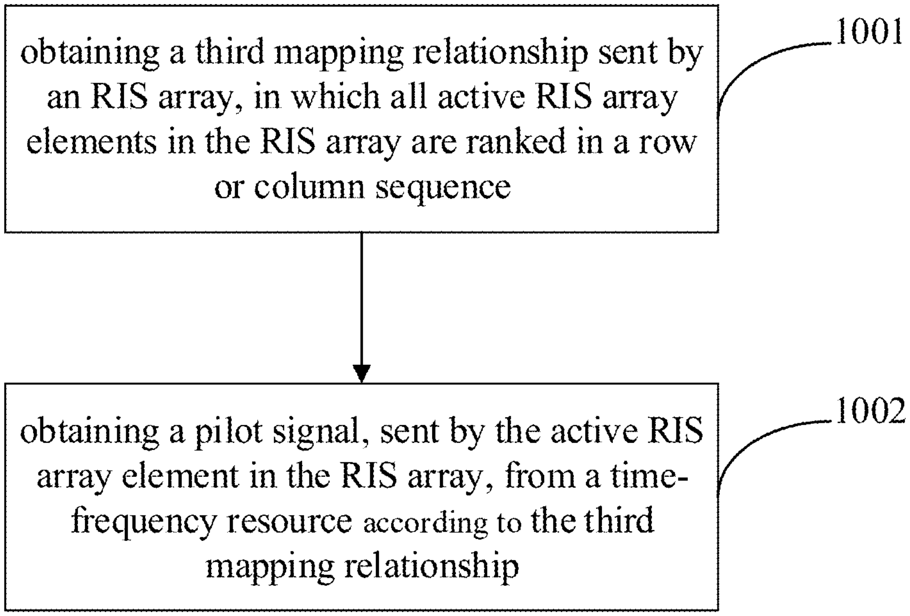
FIG. 10 is a flowchart of a method for sending a signal provided by a further embodiment of the present disclosure.

FIG. 10 is a flowchart of a method for sending a signal provided by an embodiment of the present disclosure, which is performed by a UE. As shown in FIG. 10, the method for sending the signal may include the following steps.

In step 1001, a third mapping relationship sent by an RIS array is obtained, and all active RIS array elements in the RIS array are ranked in a row or column sequence.

The third mapping relationship includes: the ranked active RIS array elements being mapped to different subcarriers of a same OFDM symbol, and/or the ranked active RIS array elements being mapped to same subcarriers of different OFDM symbols, and/or the ranked active RIS array elements being mapped to different subcarriers of different OFDM symbols.

In step 1002, a pilot signal sent by the active RIS array element in the RIS array is obtained from a time-frequency resource based on the third mapping relationship.

In summary, in the method for sending the signal provided in embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 11:
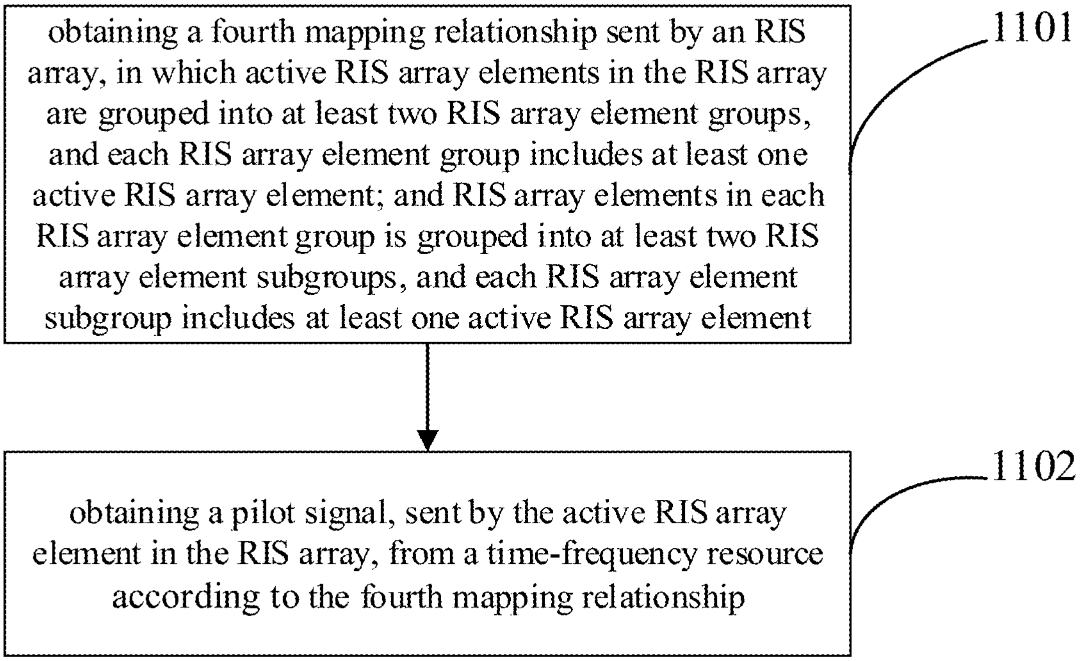
FIG. 11 is a flowchart of a method for sending a signal provided by a further embodiment of the present disclosure.

FIG. 11 is a flowchart of a method for sending a signal provided by an embodiment of the present disclosure, which is performed by a UE. As shown in FIG. 11, the method for sending the signal may include the following steps.

In step 1101, a fourth mapping relationship sent by an RIS array is obtained, active RIS array elements in the RIS array are grouped into at least two RIS array element groups, and each RIS array element group includes at least one active RIS array element, and RIS array elements in each RIS array element group is grouped into at least two RIS array element subgroups, and each RIS array element subgroup includes at least one active RIS array element.

The fourth mapping relationship includes: different RIS array element subgroups being mapped to different OFDM symbols, and i-th RIS array element subgroups of different RIS array element groups being mapped to same subcarriers of different OFDM symbols, where i is a positive integer.

In step 1102, a pilot signal sent by the active RIS array element in the RIS array is obtained from a time-frequency resource based on the fourth mapping relationship.

In summary, in the method for sending the signal provided in embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 12:
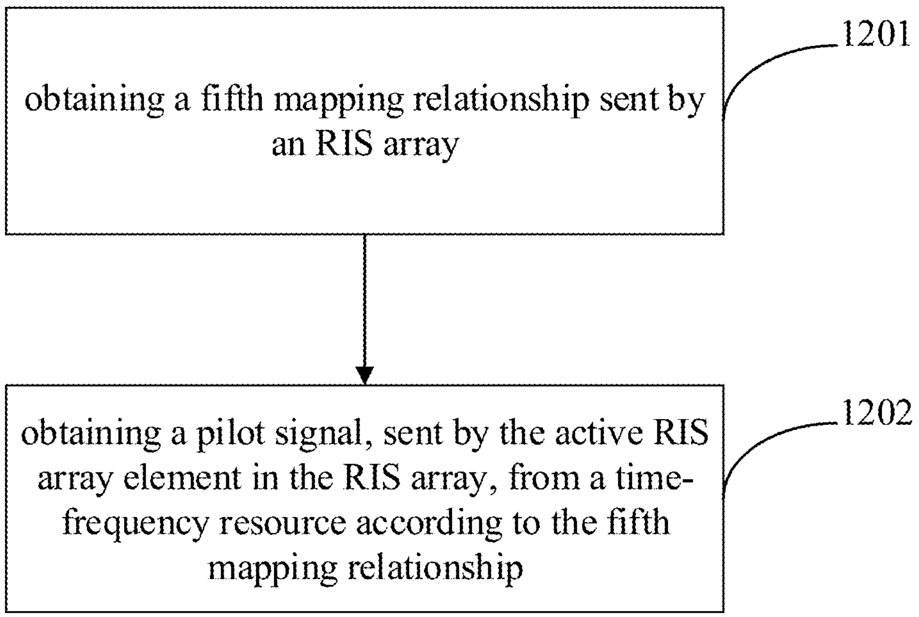
FIG. 12 is a flowchart of a method for sending a signal provided by a further embodiment of the present disclosure.

FIG. 12 is a flowchart of a method for sending a signal provided by an embodiment of the present disclosure, which is performed by a UE. As shown in FIG. 12, the method for sending the signal may include the following steps.

In step 1201, a fifth mapping relationship sent by an RIS array is obtained.

The fifth mapping relationship includes: the active RIS array elements being mapped to subcarriers of the time domain resource according to a spatial position arrangement of the active RIS array elements in the RIS array.

In step 1202, a pilot signal sent by the active RIS array element in the RIS array is obtained from a time-frequency resource based on the fifth mapping relationship.

In summary, in the method for sending the signal provided in embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

Figure 13:
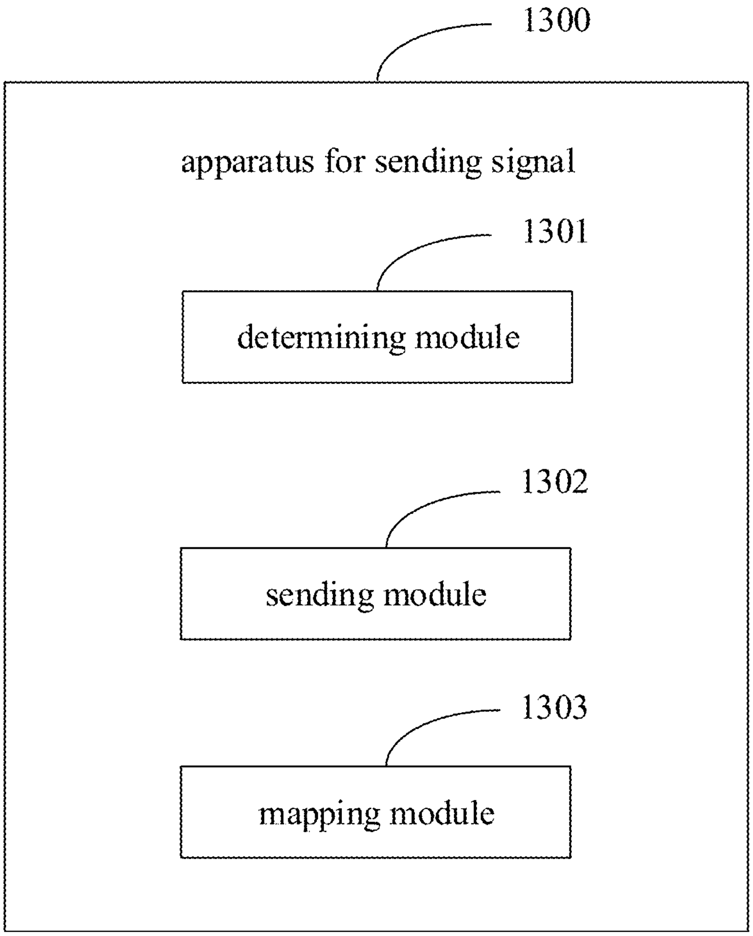
FIG. 13 is a schematic diagram of an apparatus for sending a signal provided by an embodiment of the present disclosure.

FIG. 13 is a schematic diagram of an apparatus 1300 for sending a signal provided by an embodiment of the present disclosure, which is applied to an RIS array element. As shown in FIG. 13, the apparatus 1300 for sending the signal may include: a determining module 1301 configured to determine a mapping relationship between an active RIS array element in the RIS array and a time domain resource; a sending module 1302 configured to send the mapping relationship to a user equipment (UE); and a mapping module 1303 configured to map a pilot signal sent by the active RIS array element to a time-frequency resource corresponding to the active RIS array element to send the pilot signal to the UE.

In summary, in the apparatus for sending the signal provided in embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

In an embodiment of the present disclosure, the apparatus is further configured to: group active RIS array elements in the RIS array to obtain at least two RIS array element groups, in which each RIS array element group includes at least one active RIS array element.

Optionally, In an embodiment of the present disclosure, the apparatus is further configured to: group active RIS array elements located in a same row into a same RIS array element group; group active RIS array elements located in a same column into a same RIS array element group.

In an embodiment of the present disclosure, the determining module is further configured to: determine the mapping relationship to be a first mapping relationship, in which the first mapping relationship includes: individual active RIS array elements in a same RIS array element group being mapped to different subcarriers of one orthogonal frequency division multiplexing (OFDM) symbol of the time domain resource, and different RIS array element groups being mapped to different OFDM symbols.

In an embodiment of the present disclosure, different RIS array element groups being mapped to different OFDM symbols include: i-th active RIS array elements in different RIS array element groups being mapped to same subcarriers of different OFDM symbols, where i is a positive integer; or i-th active RIS array elements in different RIS array element groups being mapped to different subcarriers of different OFDM symbols, where i is a positive integer.

In an embodiment of the present disclosure, the determining module is further configured to: determine the mapping relationship to be a second mapping relationship, in which the second mapping relationship includes: individual active RIS array elements in a same RIS array element group being mapped to different OFDM symbols of the time domain resource, the individual active RIS array elements in the same RIS array element group being mapped to same subcarriers of different OFDM symbols, and different RIS array element groups being mapped to different subcarriers.

In an embodiment of the present disclosure, different RIS array element groups being mapped to different subcarriers includes at least one of: subcarriers mapped by i-th active RIS array elements in different RIS array element groups belonging to a same OFDM symbol, where i is a positive integer; subcarriers mapped by i-th active RIS array elements in different RIS array element groups belonging to different OFDM symbols, where i is a positive integer.

In an embodiment of the present disclosure, the apparatus is further configured to: obtain ranked active RIS array elements by ranking all active RIS array elements in the RIS array in a row or column sequence.

In an embodiment of the present disclosure, the determining module is further configured to: determine the mapping relationship to be a third mapping relationship, in which the third mapping relationship includes: the ranked active RIS array elements being mapped to different subcarriers of a same OFDM symbol, and/or the ranked active RIS array elements being mapped to same subcarriers of different OFDM symbols, and/or the ranked active RIS array elements being mapped to different subcarriers of different OFDM symbols.

In an embodiment of the present disclosure, the apparatus is further configured to: group RIS array elements in each RIS array element group to obtain at least two RIS array element subgroups, in which each RIS array element subgroup includes at least one active RIS array element.

In an embodiment of the present disclosure, the determining module is further configured to: determine the mapping relationship to be a fourth mapping relationship, in which the fourth mapping relationship includes: different RIS array element subgroups being mapped to different OFDM symbols, and i-th RIS array element subgroups of different RIS array element groups being mapped to same subcarriers of different OFDM symbols, where i is a positive integer.

In an embodiment of the present disclosure, the determining module is further configured to: determine the mapping relationship to be a fifth mapping relationship, in which the fifth mapping relationship includes: active RIS array elements being mapped to subcarriers of the time domain resource according to a spatial position arrangement of the active RIS array elements in the RIS array.

In an embodiment of the present disclosure, a pilot signal sent by one active RIS array element occupies one subcarrier, and there is one subcarrier mapped by the one active RIS array element.

In an embodiment of the present disclosure, a pilot signal sent by one active RIS array element occupies n subcarriers, and there are n subcarriers mapped by the one active RIS array element, where n is a positive integer greater than 1.

In an embodiment of the present disclosure, the n subcarriers mapped by the one active RIS array element belong to the same OFDM symbol, and/or the n subcarriers mapped by the one active RIS array element belong to different OFDM symbols.

In an embodiment of the present disclosure, a pilot signal sent by the one active RIS array element occupies n×m subcarriers, and there are n×m subcarriers mapped by the one active RIS array element, where n and m are both positive integers.

In an embodiment of the present disclosure, the apparatus is further configured to: send position information to the UE, in which the position information is configured to indicate a position of the active RIS array element in the RIS array.

Figure 14:
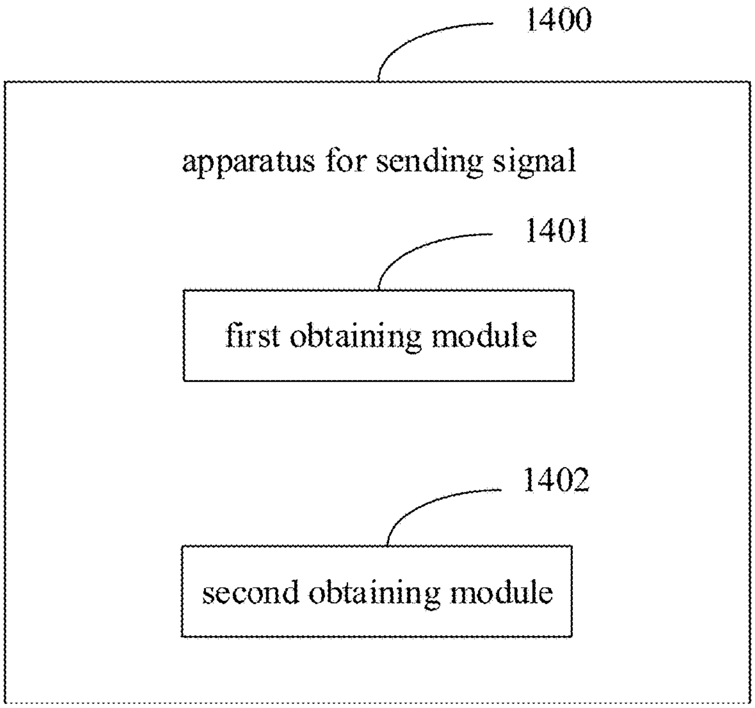
FIG. 14 is a schematic diagram of an apparatus for sending a signal provided by another embodiment of the present disclosure.

FIG. 14 is a schematic diagram of an apparatus 1400 for sending a signal provided by an embodiment of the present disclosure, which is applied to a UE. As shown in FIG. 14, the apparatus 1400 for sending the signal may include: a first obtaining module 1401 configured to obtain a mapping relationship sent by an RIS array; and a second obtaining module 1402 configured to obtain a pilot signal, sent by an active RIS array element in the RIS array, from a time-frequency resource according to the mapping relationship.

In summary, in the apparatus for sending the signal provided in embodiments of the present disclosure, the RIS array may determine the mapping relationship between the active RIS array element in the array and the time domain resource, and send the mapping relationship to the UE, and send the pilot signal to the UE by mapping the pilot signal sent by the active RIS array element to the time-frequency resource corresponding to the active RIS array element. Therefore, in the embodiments of the present disclosure, the RIS array may predetermine the mapping relationship between the active RIS array element and the time domain resource, and may send the pilot signal to the UE by mapping the pilot signal sent by the active RIS array element to the corresponding time domain resource according to the predetermined mapping relationship when the active RIS array element sends the pilot signal to the UE, thereby ensuring the stability of the pilot signal transmission. Meanwhile, when the channel estimation is subsequently performed based on the pilot signal, the accuracy of the channel estimation may be ensured.

In an embodiment of the present disclosure, active RIS array elements in the RIS array are grouped into at least two RIS array element groups, and each RIS array element group includes at least one active RIS array element.

In an embodiment of the present disclosure, individual active RIS array elements in a same RIS array element group are in a same row, or individual active RIS array elements in a same RIS array element group are in a same column.

In an embodiment of the present disclosure, the first obtaining module is further configured to: obtain a first mapping relationship sent by the RIS array, in which the first mapping relationship includes: individual active RIS array elements in a same RIS array element group being mapped to different subcarriers of one OFDM symbol of the time domain resource, and different RIS array element groups being mapped to different OFDM symbols.

In an embodiment of the present disclosure, different RIS array element groups being mapped to different OFDM symbols include: i-th active RIS array elements in different RIS array element groups being mapped to same subcarriers of different OFDM symbols, where i is a positive integer; or i-th active RIS array elements in different RIS array element groups being mapped to different subcarriers of different OFDM symbols, where i is a positive integer.

In an embodiment of the present disclosure, the first obtaining module is further configured to: obtain a second mapping relationship sent by the RIS array, in which the second mapping relationship includes: individual active RIS array elements in a same RIS array element group being mapped to different OFDM symbols of the time domain resource, the individual active RIS array elements in the same RIS array element group being mapped to same subcarriers of different OFDM symbols, and different RIS array element groups being mapped to different subcarriers.

In an embodiment of the present disclosure, different RIS array element groups being mapped to different subcarriers include at least one of: subcarriers mapped by i-th active RIS array elements in different RIS array element groups belonging to a same OFDM symbol, where i is a positive integer; subcarriers mapped by i-th active RIS array elements in different RIS array element groups belonging to different OFDM symbols, where i is a positive integer.

In an embodiment of the present disclosure, all active RIS array elements in the RIS array are ranked in a row or column sequence.

In an embodiment of the present disclosure, the first obtaining module is further configured to: obtain a third mapping relationship sent by the RIS array, in which the third mapping relationship includes: the ranked active RIS array elements being mapped to different subcarriers of a same OFDM symbol, and/or the ranked active RIS array elements being mapped to same subcarriers of different OFDM symbols, and/or the ranked active RIS array elements being mapped to different subcarriers of different OFDM symbols.

In an embodiment of the present disclosure, RIS array elements in each RIS array element group is grouped into at least two RIS array element subgroups, and each RIS array element subgroup includes at least one active RIS array element.

In an embodiment of the present disclosure, the first obtaining module is further configured to: obtain a fourth mapping relationship sent by the RIS array, in which the fourth mapping relationship includes: different RIS array element subgroups being mapped to different OFDM symbols, and i-th RIS array element subgroups of different RIS array element groups being mapped to same subcarriers of different OFDM symbols, where i is a positive integer.

In an embodiment of the present disclosure, the first obtaining module is further configured to: obtain a fifth mapping relationship sent by the RIS array, in which the fifth mapping relationship includes: the active RIS array elements being mapped to subcarriers of the time domain resource according to a spatial position arrangement of the active RIS array elements in the RIS array.

In an embodiment of the present disclosure, a pilot signal sent by one active RIS array element occupies one subcarrier, and there is one subcarrier mapped by the one active RIS array element.

In an embodiment of the present disclosure, a pilot signal sent by the one active RIS array element occupies n subcarriers, and there are n subcarriers mapped by the one active RIS array element, where n is a positive integer greater than 1.

In an embodiment of the present disclosure, the n subcarriers mapped by the one active RIS array element belong to the same OFDM symbol, and/or the n subcarriers mapped by the one active RIS array element belong to different OFDM symbols.

In an embodiment of the present disclosure, a pilot signal sent by the one active RIS array element occupies n×m subcarriers, and there are n×m subcarriers mapped by the one active RIS array element, where n and m are both positive integers.

In an embodiment of the present disclosure, the apparatus is further configured to: obtain position information sent by the RIS array, in which the position information is configured to indicate a position of the active RIS array element in the RIS array.

In an embodiment of the present disclosure, the second obtaining module is further configured to: obtain the pilot signal, sent by the active RIS array element in the RIS array, from the time-frequency resource based on the position information and the mapping relationship.

Figure 15:
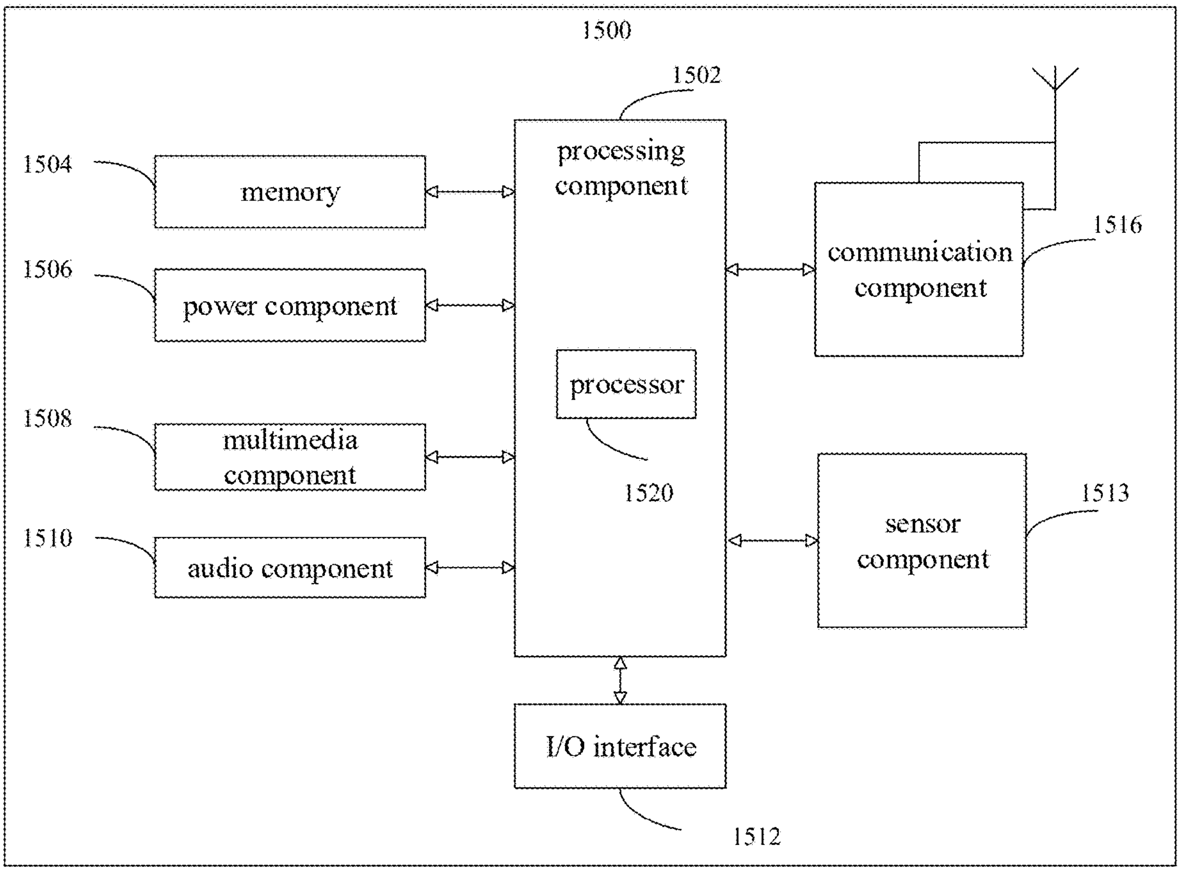
FIG. 15 is a block diagram of a user equipment provided by an embodiment of the present disclosure.

FIG. 15 is a block diagram of a UE 1500 provided by an embodiment of the present disclosure. For example, the UE 1500 may be a mobile phone, a computer, a digital broadcast terminal device, a messaging device, a game console, a tablet device, a medical device, a fitness device, a personal digital assistant, or the like.

Referring to FIG. 15, the UE 1500 may include at least one of the following components: a processing component 1502, a memory 1504, a power component 1506, a multimedia component 1508, an audio component 1510, an input/output (I/O) interface 1512, a sensor component 1513, and a communication component 1516.

The processing component 1502 typically controls overall operations of the UE 1500, such as the operations associated with display, phone calls, data communications, camera operations, and recording operations. The processing component 1502 may include at least one processor 1520 to execute instructions to perform all or some of the steps in the above-described methods. Moreover, the processing component 1502 may include at least one module which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the UE 1500. Examples of such data include instructions for any applications or methods operated on the UE 1500, contact data, phonebook data, messages, pictures, videos, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the UE 1500. The power component 1506 may include a power management system, at least one power sources, and any other components associated with the generation, management, and distribution of power in the UE 1500.

The multimedia component 1508 includes a screen providing an output interface between the UE 1500 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensors to sense touches, swipes, and gestures on the touch panel. The touch sensors may not only sense a boundary of a touch or swipe action, but also sense a wake-up time and a pressure associated with the touch or swipe action. In some embodiments, the multimedia component 1508 includes a front camera and/or a rear camera. The front camera and/or the rear camera may receive an external multimedia datum while the UE 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone (MIC) configured to receive an external audio signal when the UE 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as keyboards, click wheels, buttons, and the like. The buttons may include, but are not limited to, a home button, a volume button, a starting button, and a locking button.

The sensor component 1513 includes at least one sensor to provide status assessments of various aspects of the UE 1500. For instance, the sensor component 1513 may detect an open/closed status of the equipment 1500, relative positioning of components, e.g., the display and the keypad, of the UE 1500. The sensor component 1513 may also detect a change in position of the UE 1500 or a component of the UE 1500, a presence or absence of user contact with the UE 1500, an orientation or an acceleration/deceleration of the UE 1500, and a change in temperature of the UE 1500. The sensor component 1513 may include a proximity sensor configured to detect the presence of nearby objects without any physical contact. The sensor component 1513 may further include a light sensor, such as a CMOS or CCD image sensor, for use in imaging applications. In some embodiments, the sensor component 1513 may further include an accelerometer sensor, a gyroscope sensor, a magnetic sensor, a pressure sensor, or a temperature sensor.

The communication component 1516 is configured to facilitate communication, wired or wireless, between the UE 1500 and other devices. The UE 1500 can access a wireless network based on a communication standard, such as Wi-Fi, 2G, or 3G, or a combination thereof. In an illustrative embodiment, the communication component 1516 receives a broadcast signal or broadcast associated information from an external broadcast management system via a broadcast channel. In an illustrative embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 1500 may be implemented with at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above methods.

Figure 16:
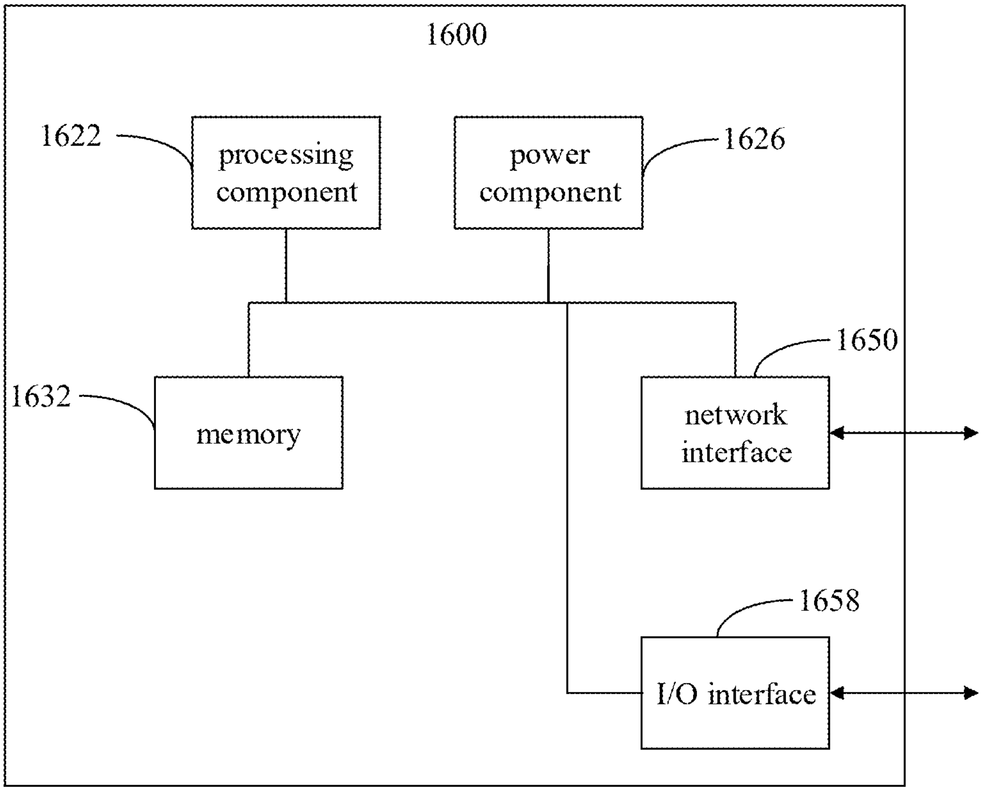
FIG. 16 is a block diagram of a network side device provided by an embodiment of the present disclosure.

FIG. 16 is a block diagram of a network side device 1600 provided by an embodiment of the present disclosure. For example, the network side device 1600 may be provided as a network side device. Referring to FIG. 16, the network side device 1600 includes a processing component 1622, which further includes at least one of processors, and a memory resource represented by a memory 1632 configured to store instructions executable by the processing component 1622, such as application programs. The application programs stored in the memory 1632 may include one or more modules each corresponding to a set of instructions. In addition, the processing component 1622 is configured to execute instructions to perform any of the foregoing methods performed by the network side device, for example, the method shown in FIG. 1.

The network side device 1600 may also include a power component 1626 configured to perform the power management of the network side device 1600, a wired or wireless network interfaces 1650 configured to connect the network side device 1600 to a network, and an input-output (I/O) interface 1658. The network side device 1600 may operate based on an operating system stored in the memory 1632, such as Windows Server™, Mac OS X™, Unix™, Linux™, Free BSD™, or the like.

In the above embodiments provided by the present disclosure, the methods provided in embodiments of the present disclosure are introduced from perspectives of the RIS array and the UE respectively. In order to implement the various functions in the methods provided by the above embodiments of the present disclosure, the UE may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

In the above embodiments provided by the present disclosure, the methods provided in embodiments of the present disclosure are introduced from perspectives of the RIS array and the UE respectively. In order to implement the various functions in the methods provided by the above embodiments of the present disclosure, the UE may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Embodiments of the present disclosure provide a communication apparatus, which may include a transceiving module and a processing module. The transceiving module may include a sending module and/or a receiving module, the sending module is configured to implement a sending function, and the receiving module is configured to implement a receiving function. The transceiving module may implement the sending function and/or the receiving function.

The communication apparatus may be a terminal device (such as the terminal device in the foregoing method embodiments), may also be an apparatus in the terminal device, and may also be an apparatus that can be used in conjunction with the terminal device. Alternatively, the communication apparatus may be a network device, may also be an apparatus in the network device, and may also be an apparatus that can be used in conjunction with the network device.

Embodiments of the present disclosure provide a communication device, which may be a network device, may also be a terminal device (such as the terminal device in the foregoing method embodiments), may also be a chip, a chip system, or a processor that supports the network device to implement the above methods, and may also be a chip, a chip system, or a processor that supports the terminal device to implement the above methods. The device may be configured to implement the methods as described in the above method embodiments, and for details, reference may be made to the descriptions in the above method embodiments.

The communications device may include one or more processors. The processor may be a general-purpose processor or a special-purpose processor. For example, it may be a baseband processor or a central processing unit. The baseband processor may be configured to process a communication protocol and communication data, and the central processing unit may be configured to control a communication device (such as a network side device, a baseband chip, a terminal device, a terminal device chip, a DU or a CU, etc.), execute computer programs, and process data of the computer programs.

In some embodiments, the communication device may further include one or more memories having stored therein a computer program. The processor executes the computer program, to cause the communication device to implement the methods as described in the above method embodiments. In some embodiments, the memory may have stored therein data. The communication device and the memory may be provided separately or integrated together.

In some embodiments, the communication device may further include a transceiver and an antenna. The transceiver may be called a transceiving element, a transceiving machine, a transceiving circuit or the like, for implementing a transceiving function. The transceiver may include a receiver and a transmitter. The receiver may be called a receiving machine, a receiving circuit or the like, for implementing a receiving function. The transmitter may be called a sending machine, a sending circuit or the like, for implementing a sending function.

In some embodiments, the communication device may further include one or more interface circuits. The interface circuit is configured to receive a code instruction and transmit the code instruction to the processor. The processor runs the code instruction to enable the communication device to execute the methods as described in the above method embodiments.

The communication device is a terminal device (such as the terminal device in the foregoing method embodiments). The processor is configured to execute the method shown in any one of FIGS. 1 to 4.

The communication device is a network device. The transceiver is configured to execute the method shown in any one of FIGS. 5 to 7.

In an implementation, the processor may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read or write codes/data, or the above transceiving circuit, interface or interface circuit may be configured to transmit or transfer signals.

In an implementation, the processor may have stored therein a computer program that, when run on the processor, causes the communication device to implement the methods as described in the above method embodiments. The computer program may be embedded in the processor, and in this case, the processor may be implemented by a hardware.

In an implementation, the communication device may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), an N-type metal-oxide-semiconductor (NMOS), a P-type metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the network device or the terminal device (such as the terminal device in the foregoing method embodiments), but the scope of the communication device described in the present disclosure is not limited thereto, and the structure of the communication device may not be limited thereto. The communication device may be a stand-alone device or may be a part of a larger device. For example, the communication device may be: (1) a stand-alone integrated circuit (IC), or a chip, or a chip system or subsystem; (2) a set of one or more ICs, in some embodiments, the set of ICs may also include a storage component for storing data and computer programs; (3) an ASIC, such as a modem; (4) a module that may be embedded in other devices; (5) a receiver, a terminal device, an intelligent terminal device, a cellular phone, a wireless device, a handheld machine, a mobile unit, a vehicle device, a network device, a cloud device, an artificial intelligence device, etc.; (6) others.

For the case where the communication device may be a chip or a chip system, the chip includes a processor and an interface. In the chip, one or more processors may be provided, and more than one interface may be provided.

In some embodiments, the chip further includes a memory for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such an implementation should not be understood as extending beyond the protection scope of embodiments of the present disclosure.

Embodiments of the present disclosure also provide a system for sending a signal. The system includes the communication apparatus as the terminal device as described in the foregoing method embodiments and the communication apparatus as the network device as described in the foregoing embodiments, or the system includes the communication device as the terminal device as described in the foregoing method embodiments and the communication device as the network device as described in the foregoing embodiments.

The present disclosure also provides a readable storage medium having stored thereon instructions that, when executed by a computer, cause functions of any of the above method embodiments to be implemented.

The present disclosure also provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or some of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server or data center to another website, computer, server or data center in a wired manner (such as via a coaxial cable, an optical fiber, a digital subscriber line (DSL)) or a wireless manner (such as infrared, wireless, or via microwave, etc.). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)), etc.

Those of ordinary skill in the art can understand that the first, second, and other numeral numbers involved in the present disclosure are distinguished only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first," "second," "third," "A," "B,""C," and "D" etc., and these technical features described with the "first," "second,""third,""A,""B,""C, "and "D"have no order of priority and have no order of size.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for sending a signal, performed by a reconfigurable intelligent surface (RIS) array, comprising:

determining a mapping relationship between an active RIS array element in the RIS array and a time-frequency resource;

sending the mapping relationship to a user equipment (UE); and sending a pilot signal to the UE by mapping the pilot signal sent by the active RIS array element to the time-frequency resource corresponding to the active RIS array element;

wherein a pilot signal sent by one active RIS array element occupies one subcarrier, and there is one subcarrier mapped by the one active RIS array element;

or wherein the pilot signal sent by the one active RIS array element occupies n subcarriers, and there are n subcarriers mapped by the one active RIS array element, where n is a positive integer greater than 1;

or wherein the pilot signal sent by the one active RIS array element occupies n×m subcarriers, and there are n×m subcarriers mapped by the one active RIS array element, where n and m are both positive integers.

2. The method according to claim 1, further comprising: grouping active RIS array elements in the RIS array to obtain at least two RIS array element groups, wherein each RIS array element group comprises at least one active RIS array element.

3. The method according to claim 2, wherein grouping the active RIS array elements in the RIS array to obtain the at least two RIS array element groups comprises at least one of:

grouping active RIS array elements located in a same row into a same RIS array element group;

grouping active RIS array elements located in a same column into a same RIS array element group.

4. The method according to claim 2, wherein determining the mapping relationship between the active RIS array element in the RIS array and the time-frequency resource comprises:

determining the mapping relationship to be a first mapping relationship, wherein the first mapping relationship comprises: individual active RIS array elements in a same RIS array element group being mapped to different subcarriers of one orthogonal frequency division multiplexing (OFDM) symbol of the time-frequency resource, and different RIS array element groups being mapped to different OFDM symbols.

5. The method according to claim 4, wherein the different RIS array element groups being mapped to the different OFDM symbols comprise:

i-th active RIS array elements in the different RIS array element groups being mapped to same subcarriers of the different OFDM symbols, where i is a positive integer; or i-th active RIS array elements in the different RIS array element groups being mapped to different subcarriers of the different OFDM symbols, where i is a positive integer.

6. The method according to claim 2, wherein determining the mapping relationship between the active RIS array element in the RIS array and the time-frequency resource comprises:

determining the mapping relationship to be a second mapping relationship, wherein the second mapping relationship comprises: individual active RIS array elements in a same RIS array element group being mapped to different orthogonal frequency division multiplexing (OFDM) symbols of the time-frequency resource, the individual active RIS array elements in the same RIS array element group being mapped to same subcarriers of different OFDM symbols, and different RIS array element groups being mapped to different subcarriers.

7. The method according to claim 6, wherein the different RIS array element groups being mapped to the different subcarriers comprises at least one of:

subcarriers mapped by i-th active RIS array elements in the different RIS array element groups belonging to a same OFDM symbol, where i is a positive integer; or subcarriers mapped by i-th active RIS array elements in the different RIS array element groups belonging to the different OFDM symbols, where i is a positive integer.

8. The method according to claim 1, further comprising:

obtaining ranked active RIS array elements by ranking all active RIS array elements in the RIS array in a row or column sequence;

wherein determining the mapping relationship between the active RIS array element in the RIS array and the time-frequency resource comprises:

determining the mapping relationship to be a third mapping relationship, wherein the third mapping relationship comprises at least one of: the ranked active RIS array elements being mapped to different subcarriers of a same orthogonal frequency division multiplexing (OFDM) symbol, the ranked active RIS array elements being mapped to same subcarriers of different OFDM symbols, or the ranked active RIS array elements being mapped to different subcarriers of the different OFDM symbols.

9. The method according to claim 2, further comprising: grouping RIS array elements in each RIS array element group to obtain at least two RIS array element subgroups, wherein each RIS array element subgroup comprises at least one active RIS array element.

10. The method according to claim 9, wherein determining the mapping relationship between the active RIS array element in the RIS array and the time-frequency resource comprises:

determining the mapping relationship to be a fourth mapping relationship, wherein the fourth mapping relationship comprises: different RIS array element subgroups being mapped to different OFDM symbols, and i-th RIS array element subgroups of different RIS array element groups being mapped to same subcarriers of different OFDM symbols, where i is a positive integer.

11. The method according to claim 1, wherein determining the mapping relationship between the active RIS array element in the RIS array and the time-frequency resource comprises:

determining the mapping relationship to be a fifth mapping relationship, wherein the fifth mapping relationship comprises: active RIS array elements being mapped to subcarriers of the time-frequency resource according to a spatial position arrangement of the active RIS array elements in the RIS array.

12. The method according to claim 1, wherein the n subcarriers mapped by the one active RIS array element belong to a same orthogonal frequency division multiplexing (OFDM) symbol, and/or the n subcarriers mapped by the one active RIS array element belong to different OFDM symbols.

13. The method according to claim 1, further comprising: sending position information to the UE, wherein the position information is configured to indicate a position of the active RIS array element in the RIS array.

14. A method for sending a signal, performed by a UE, comprising:

obtaining a mapping relationship sent by a reconfigurable intelligent surface (RIS) array; and obtaining a pilot signal, sent by an active RIS array element in the RIS array, from a time-frequency resource according to the mapping relationship;

wherein a pilot signal sent by one active RIS array element occupies one subcarrier, and there is one subcarrier mapped by the one active RIS array element;

or wherein the pilot signal sent by the one active RIS array element occupies n subcarriers, and there are n subcarriers mapped by the one active RIS array element, where n is a positive integer greater than 1;

or wherein the pilot signal sent by the one active RIS array element occupies n×m subcarriers, and there are n x m subcarriers mapped by the one active RIS array element, where n and m are both positive integers.

15. The method according to claim 14, further comprising:

obtaining position information sent by the RIS array, wherein the position information is configured to indicate a position of the active RIS array element in the RIS array;

wherein obtaining the pilot signal, sent by the active RIS array element in the RIS array, from the time-frequency resource according to the mapping relationship comprises:

obtaining the pilot signal, sent by the active RIS array element in the RIS array, from the time-frequency resource based on the position information and the mapping relationship.

16. A reconfigurable intelligent surface (RIS) array, comprising:

a processor; and a memory having stored therein a computer program that, when executed by the processor, causes the RIS array to implement:

determining a mapping relationship between an active RIS array element in the RIS array and a time-frequency resource;

sending the mapping relationship to a user equipment (UE); and sending a pilot signal to the UE by mapping the pilot signal sent by the active RIS array element to the time-frequency resource corresponding to the active RIS array element;

wherein a pilot signal sent by one active RIS array element occupies one subcarrier, and there is one subcarrier mapped by the one active RIS array element;

or wherein the pilot signal sent by the one active RIS array element occupies n subcarriers, and there are n subcarriers mapped by the one active RIS array element, where n is a positive integer greater than 1;

or wherein the pilot signal sent by the one active RIS array element occupies n×m subcarriers, and there are n×m subcarriers mapped by the one active RIS array element, where n and m are both positive integers.

17. A user equipment (UE), comprising:

a processor; and a memory having stored therein a computer program that, when executed by the processor, causes the UE to implement the method according to claim 14.

18. A non-transitory computer-readable storage medium having stored therein instructions that, when executed, cause the method according to claim 1 to be implemented.

19. A non-transitory computer-readable storage medium having stored therein instructions that, when executed, cause the method according to claim 14 to be implemented.

* * * * *